(12) United States Patent
Hekal

(10) Patent No.: US 6,696,002 B1
(45) Date of Patent: Feb. 24, 2004

(54) CO-CONTINUOUS INTERCONNECTING CHANNEL MORPHOLOGY POLYMER HAVING MODIFIED SURFACE PROPERTIES

(75) Inventor: Ihab M. Hekal, Stamford, CT (US)

(73) Assignee: Capitol Security Plastics, Inc., Auburn, IL (US)

( * ) Notice: Subject to any disclaimer, the term of this patent is extended or adjusted under 35 U.S.C. 154(b) by 173 days.

(21) Appl. No.: 09/627,631

(22) Filed: Jul. 28, 2000

Related U.S. Application Data

(60) Provisional application No. 60/192,898, filed on Mar. 29, 2000.

(51) Int. Cl.[7] .................................................. B01J 20/28
(52) U.S. Cl. ..................... 264/239; 264/331.13; 34/95; 252/194; 502/402; 502/405; 428/546; 428/304.4; 428/311; 428/317.1; 428/317.3; 428/317.5; 428/317.7
(58) Field of Search ........................... 264/239, 331.13; 34/95; 252/194; 502/402, 405; 428/546, 304.4, 317.1, 317.3, 317.5, 317.7, 311

(56) References Cited

U.S. PATENT DOCUMENTS

| | | |
|---|---|---|
| 1,481,971 A | 1/1924 | Whiting |
| 1,532,831 A | 4/1925 | Mastin |
| 2,202,742 A | 5/1940 | McCorkhill |
| 2,511,666 A | 6/1950 | Barr |
| 2,638,179 A | 5/1953 | Yard |
| 2,991,500 A | 7/1961 | Hagen |
| 3,013,308 A | 12/1961 | Armour |
| 3,101,242 A | 8/1963 | Jackson, Jr. |
| 3,156,402 A | 11/1964 | Dupuis |
| 3,245,946 A | 4/1966 | O'Connor et al. |
| 3,256,411 A | 6/1966 | Grasty |
| 3,322,355 A | 5/1967 | Bryant |
| 3,326,810 A | 6/1967 | Dolan et al. |
| 3,375,208 A | 3/1968 | Duddy |
| 3,537,676 A | 11/1970 | Miller |
| 3,567,085 A | 3/1971 | Flores |
| 3,687,062 A | 8/1972 | Frank |
| 3,704,806 A | 12/1972 | Plachenov et al. |
| 3,730,372 A | 5/1973 | Komendowski |
| 3,750,966 A | 8/1973 | Anderson |
| 3,804,282 A | 4/1974 | Komendowski |
| 3,833,406 A | 9/1974 | White |
| 3,926,379 A | 12/1975 | Dryden eta l. |
| 3,929,295 A | 12/1975 | Montalbano |
| 3,931,067 A | 1/1976 | Goldberg et al. |
| 4,013,566 A | 3/1977 | Taylor |
| 4,021,388 A | 5/1977 | Griffin |

(List continued on next page.)

FOREIGN PATENT DOCUMENTS

| | | |
|---|---|---|
| DE | 33 27 638 A1 | 7/1983 |
| DE | 4013799 | 10/1991 |
| EP | 0172714 A1 | 2/1986 |
| EP | 0225 593 A3 | 6/1987 |
| EP | 931087639 | 9/1993 |
| EP | 0 831 128 A1 | 5/1996 |
| EP | 0 805 178 A1 | 4/1997 |
| WO | WO 96/29603 | 9/1996 |
| WO | WO 96/33108 | 10/1996 |
| WO | PCT/US97/03610 | 5/1997 |
| WO | PCT/WO97/27483 | 7/1997 |
| WO | PCT/WO97/32663 | 9/1997 |
| WO | PCT/WO98/39231 | 9/1998 |

*Primary Examiner*—Suzanne E. McDowell
(74) *Attorney, Agent, or Firm*—Barry J. Schindler, Esq.; Dreier & Baritz LLP

(57) ABSTRACT

The present invention includes a composition having a co-continuous interconnecting channel morphology. These co-continuous interconnecting channels are predominately occupied with a polymer and particles that control the surface properties of the composition. The polymer composition may be used to form a desired shaped article such as plug type inserts and liners for closed containers, or it may be formed into a film, sheet, bead or pellet.

13 Claims, 24 Drawing Sheets

U.S. PATENT DOCUMENTS

| | | |
|---|---|---|
| 4,029,830 A | 6/1977 | Yamamoto |
| 4,036,360 A | 7/1977 | Deffeyes |
| 4,081,397 A | 3/1978 | Booe |
| 4,165,743 A | 8/1979 | Denning |
| 4,201,209 A | 5/1980 | LeVeen et al. |
| 4,240,937 A | 12/1980 | Allen |
| 4,243,767 A | 1/1981 | Kaufman et al. |
| 4,284,548 A | 8/1981 | Kaufman et al. |
| 4,284,671 A | 8/1981 | Cancio et al. |
| 4,387,803 A | 6/1983 | Mercil |
| 4,394,144 A | 7/1983 | Aoki |
| 4,405,360 A | 9/1983 | Cardarelli |
| 4,407,897 A | 10/1983 | Farrell et al. |
| 4,425,410 A | 1/1984 | Farrell et al. |
| 4,447,565 A | 5/1984 | Lula et al. |
| 4,464,443 A | 8/1984 | Farrell et al. |
| 4,485,204 A | 11/1984 | Nabors |
| 4,533,576 A | 8/1985 | Tanahashi et al. |
| 4,547,536 A | 10/1985 | Nabors |
| 4,554,297 A | 11/1985 | Dabi |
| 4,573,258 A | 3/1986 | Io et al. |
| 4,665,050 A | 5/1987 | Degan et al. |
| 4,686,093 A | 8/1987 | Flanigen et al. |
| 4,725,393 A | 2/1988 | Nasu |
| 4,770,944 A | 9/1988 | Farrell et al. |
| 4,772,300 A | 9/1988 | Cullen et al. |
| 4,783,056 A | 11/1988 | Abrams |
| 4,783,206 A | 11/1988 | Cullen et al. |
| 4,792,484 A | 12/1988 | Moritani |
| 4,834,234 A | 5/1989 | Sacherer et al. |
| 4,869,967 A | 9/1989 | Inoue et al. |
| 4,931,246 A | 6/1990 | Kudert et al. |
| 4,969,998 A | 11/1990 | Henn |
| 4,994,312 A | 2/1991 | Maier et al. |
| 5,078,909 A | 1/1992 | Shigeta et al. |
| 5,114,003 A | 5/1992 | Jackisch et al. |
| 5,118,655 A | 6/1992 | Pedersen |
| 5,128,182 A | 7/1992 | Bunker et al. |
| 5,130,018 A | 7/1992 | Tolman et al. |
| 5,143,763 A | 9/1992 | Yamada et al. |
| 5,154,960 A | 10/1992 | Mucci et al. |
| 5,228,532 A | 7/1993 | Browning et al. |
| 5,242,652 A | 9/1993 | Savigny |
| 5,267,646 A | 12/1993 | Inoue et al. |
| 5,286,407 A | 2/1994 | Inoue et al. |
| 5,304,419 A | 4/1994 | Shores |
| 5,314,733 A | 5/1994 | Saito et al. |
| 5,320,778 A | 6/1994 | Miksic et al. |
| 5,344,589 A | 9/1994 | Miksic et al. |
| 5,393,457 A | 2/1995 | Miksic et al. |
| 5,399,609 A | 3/1995 | Moss |
| 5,415,907 A | 5/1995 | Inoue et al. |
| 5,432,214 A | 7/1995 | Lancesseur |
| 5,494,155 A | 2/1996 | Evans et al. |
| 5,496,397 A | 3/1996 | Fischer et al. |
| 5,518,761 A | 5/1996 | Hatsuda et al. |
| 5,551,141 A | 9/1996 | De'Ath et al. |
| 5,571,581 A | 11/1996 | Koizumi et al. |
| 5,580,369 A | 12/1996 | Belding et al. |
| 5,596,051 A | 1/1997 | Jahns et al. |
| 5,633,351 A | 5/1997 | Reed |
| 5,656,503 A | 8/1997 | May et al. |
| 5,773,105 A | 6/1998 | Klett |
| 5,814,136 A | 9/1998 | Wood |
| 5,881,026 A | 3/1999 | Baur et al. |
| 5,911,937 A | 6/1999 | Hekal |
| 6,080,350 A | 6/2000 | Hekal |
| 6,124,006 A | 9/2000 | Hekal |
| 6,130,263 A | 10/2000 | Hekal |
| 6,174,952 B1 | 1/2001 | Hekal et al. |
| 6,177,183 B1 | 1/2001 | Hekal |

CO-CONTINUOUS INTERCONNECTING CHANNEL MORPHOLOGY POLYMER HAVING MODIFIED SURFACE PROPERTIES

This application is claiming the benefit of the prior filed co-pending provisional application, U.S. Ser. No. 60/192,898 filed Mar. 29, 2000.

FIELD OF THE INVENTION

This invention generally relates to a composition having co-continuous interconnecting channel morphology comprising three components—two polymers (i.e. components A and B) and a particle (i.e. component C) wherein the channels consist mainly of component B and the majority of component C resides in the channels. This co-continuous interconnecting channel morphology is designed to control the surface properties of the composition. Components A and B are generally immiscible within each other. In addition, one criteria for selecting component C and components A and B may be based on component C preferential affinity for component B over component A. Another criteria for selecting components B and C may be based on the capability of the combination of components B and C to affect the surface properties of the composition. For example, component C may be a particle that has active properties (e.g. absorption) or has passive properties (e.g. inert). In one embodiment, the composition of the present invention is useful in the manufacture of shaped articles such as containers, films sheets, labels, and tape for applications requiring a tailored surface property of the material.

BACKGROUND OF THE INVENTION

Labels, tapes and similar constructions are widespread in all applications of the market place. Many such constructions include a release liner coated with adhesive, such as a pressure-sensitive adhesive (PSA), which is laminated to a paper or film face stock. Removal of the release liner allows the construction—face stock coated with adhesive—to be adhered to a substrate.

Adhesive films are generally used as pressure sensitive films to apply markings like decals, labels etc. on different kinds of substrates. Examples of these substrates are metals, glass, plastics, etc. A special type of the latter is vinyl coated canvas for trucks. Both paper and plastic film have also been used extensively as print media for electrophotographic printers and copiers, including "laser printers" now used in offices and homes around the world.

While a variety of materials are used as face stock for pressure sensitive adhesive labels and tapes, not all such materials are suitable for the wide range of calendering, printing, and other processing steps currently used in the label and tape industry, including electrophotographic printing. Coated, bleached, kraft paper is probably the least expensive and most often used material for labels. In recent years, however, there has been tremendous demand for polymeric label face stock. Polymeric films generally do not tear as easily as paper labels, and are often more suitable for high speed label application processes. In addition, polymeric film labels are preferred for use on plastic containers, as they are generally more flexible and better able to conform to the container, and less likely to form wrinkles and creases.

SUMMARY OF THE INVENTION

The present invention discloses a composition having co-continuous interconnecting channel morphology. In one embodiment, these co-continuous interconnecting channels may be designed to control the surface properties of the shaped article. Furthermore, these co-continuous interconnecting channels are occupied by a polymer and/or a particle that controls the surface properties of the composition. This polymer is mixed with at least another polymer (i.e. major component) and a particle that form the interconnecting channel morphology and a percolation path.

Figure 1:
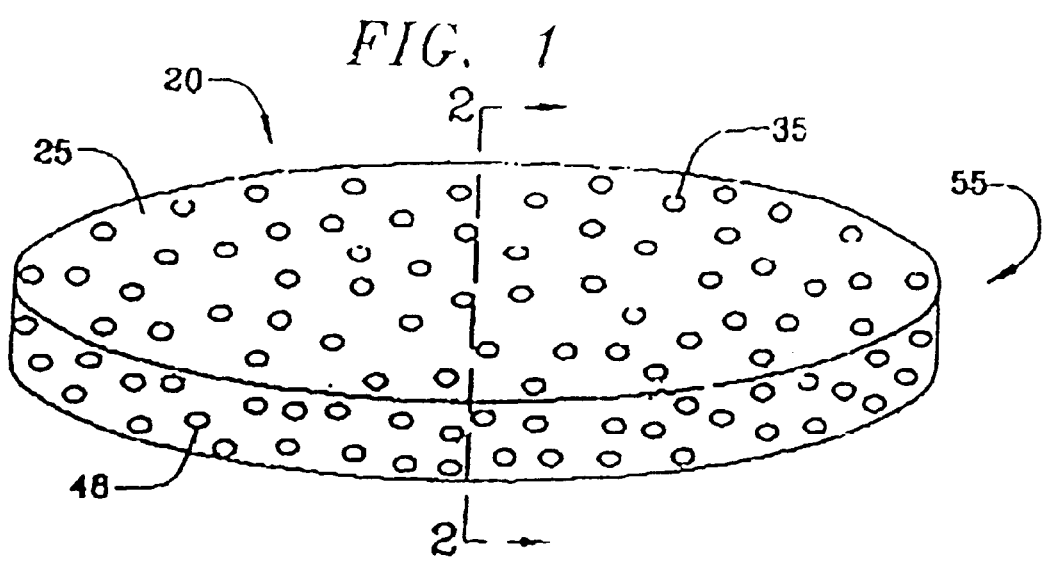
FIG. 1 is a perspective view of shaped article such as a plug, insert, tablet sheet or film constructed from the composition of the present invention showing, in an exaggerated scale, the openings of the co-continuous interconnecting channels morphology at the exterior surface of the shaped article.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

It has been discovered that a composition having co-continuous interconnecting channel morphology may be produced and that such a composition may be used in the formation of shaped articles such as containers (e.g. pouches, bags and wraps), sheets, films, pellets, beads, discs, tape, and labels. Specifically, a composition having co-continuous interconnecting channel morphology may be formed comprising at least three components, wherein: (a) component A is selected from the group of polymers that are semicrystalline polymers and amorphous polymers, wherein the amorphous polymers have a shear modulus greater than about 8 MPa; (b) component B is a polymer; (c) components A and B are immiscible within each other, and if components A and B react after mixing, components A and B are immiscible prior to reacting; (d) component C is a particle; (e) the volume fraction of component A represents at least about 50% by volume of the total volume of components A, B and C; (f) the preferential affinity between component B and component C is greater than between component A and component C; (g) at least two phases are formed, one phase is composed of a majority of component A, and the second phase is composed of a majority of components B and a majority of component C; and (h) two phases form the co-continuous interconnecting channel morphology.

Components A, B and C may be selected based on the desired end-use result—the desired end-use property. For example, component A may typically be selected based on its permeability properties (e.g. barrier properties), its chemical and/or temperature resistance properties, its strength properties, its molding properties, its film properties, its label properties, it printing properties, and/or its price (e.g. since it is the component having the largest volume fraction of the composition). Similarly, for example, component B may typically be selected based on its ability to produce the desired end-use result on the surface of component A (e.g. printing properties, adhesive properties and/or peel-strength properties) and component B's preferential affinity with component C. Also, for example, component C may typically be selected based on its ability: (a) to assist in the creation and stability of the channels; and (b) to assist in the desired end-use result on the surface of the composition. Consequently, a specific composition may be uniquely tailored and thus, uniquely optimized for surface properties. In various embodiments, component C's loading level can range from about 5 to 10%, 10% to 20%, 20% to 40% and 40% to 60% by weight with respect to component A. With respect to component B, for example, component B's loading level can range from about 3% to 5%, 5% to 8%, 8% to 12%, 12% to 15%, 15% to 25% and 25to 30% by weight with respect to component A.

In yet another embodiment, component C may be selected for multiple roles. For example, component C may be selected for its effect on overall surface properties of the composition, for its adhesion ability and for its ability to either absorb, release and/or activate a desired material.

In one embodiment relating to the method of forming the composition of the present invention, component C and component B are added to component A, which in one example is a water-insoluble polymer, when component A is in a molten state; or before component A is in the molten state, so that components B and C may be uniformly blended throughout component A. For example, such a technique may be useful when components A, B and C are all powders. In another embodiment, component B and component A are mixed prior to adding component C. Component B is either added before component A is in the molten state or after component A is in the molten state. For example, component C may be added to component A during the thermal process of forming sheets. After blending and processing, the phase containing the majority of component B is formed into interconnecting channels that contain a percolation path through the surrounding phase containing the majority of component A. The majority of component C resides in the interconnecting channels because of its preferential affinity towards component B over component A. In addition, the composition of the present invention may be described as "monolithic" because the composition does not consist of two or more discrete macroscopic layers.

For purposes of the present invention, the term "phase" means a portion of a physical system that has uniform average properties throughout, has defined boundaries and, in principle, can be separated physically from other phases. The term "gas" includes vapors such as moisture vapor. The term "water-insoluble polymer" means a polymer having a solubility in water below about 0.1% at 25° C. and atmospheric pressure. The term "hydrophilic agent" is defined as a material that is not substantially crosslinked and that has a solubility in water of at least about 1% at 25° C. and atmospheric pressure. Suitable hydrophilic agents include "channeling" agents. The term "melting point" is defined as the first order transition point of the material determined by DSC. The term "not mutually soluble" means immiscible with each other. The term "immiscibility" means that the components of the blend are driven by thermodynamic forces to separate (i.e. demix) into two or more distinct phases that will coexist indefinitely under equilibrium conditions. An example is the separation of the oil-rich and water-rich phases in a salad dressing. For purposes of the present invention, "partial" immiscibility or "partial" miscibility is deemed "immiscible" and thus, any tendency for a component to phase separate from another component is deemed "immiscible." Immiscibility may be determined by the application of one or more forms of microscopy (e.g., optical, TEM, SEM or AFM) with an observation that the components are separated into two or more distinct phases. The term "particle" means a dispersed component that is either a crystalline or amorphous solid, or a crosslinked organic or inorganic material, and that retains its shape, aside from recoverable deformations, before, during, and after the blend is compounded (e.g. extruded and/or injection molded) in the molten state at elevated temperatures. This would include, e.g., a crosslinked polymer latex.

Further, for purposes of the present invention, the term "co-continuous interconnecting channel morphology" means that the minor phase (i.e., phase containing the majority of component B) is drawn out into interconnected channels that contain a percolation path, while simultaneously, the majority phase (i.e., that containing the majority of component A) is percolating. "Percolation" means that there exists at least one unbroken path, composed only of points from within that phase, that will lead from any surface of a sample through the interior of the sample to any other surface. Such a percolation path provides a route for a desired object, such as a small molecule, an atom, an ion, or an electron, to be macroscopically transported across the sample while contacting only one of the phases. For some systems, the existence of an interconnecting channel morphology that is co-continuous may be determined by a minimum of two transport measurements that demonstrate percolation in both minor and major phases. Percolation theory is a mature branch of mathematics and physical science that is described in a variety of review articles, specialized monographs, and many introductory texts on stochastic processes, probability theory, and statistical mechanics. For example, an introductory treatment of percolation theory is described by *D. Stauffer in Introduction to Percolation Theory*, Taylor and Francis, (London 1985).

The term "preferential affinity" means that the particle (i.e., component C) has a lower interfacial energy when contacting one component than compared to contacting another component. A suitable qualitative method for determining "preferential affinity" for the present invention is the following:

(a) Blend the particle with the two components at elevated temperatures in their liquid state. Mix to achieve a macroscopically homogeneous dispersion.

(b) Cool the mixture and allow to solidify.

(c) Use a form of microscopy (e.g., TEM, SEM, and/or AFM) on a thin section to determine which of the two phases most closely contacts each particle in the field of view.

(d) The component that is in the majority in the phase that contacts the largest number of particles is the component with "preferential affinity" for the particle.

Further, the term "shear modulus" is the ratio of a measured shear stress to the magnitude of a small, elastically recoverable, shear strain that is used to produce that stress. The criterion of greater than about 8 MPa refers to the shear modulus measured at room temperature. The "shear modulus" is determined by ASTM test method E143-87 (1998). The term "polymer" means a composition that is made by reacting two or more molecular species ("monomers") to form chemically-bonded larger molecules. The term "semi-crystalline" means that the polymeric component, at ambient temperature, contains regions in which chain segments are packed with spatial registry into a periodic lattice and these regions are of sufficient size and extent to exhibit a detectable melting endotherm in a differential scanning calorimetry (DSC) measurement. The term "amorphous" means that the polymeric component, at ambient temperature, either contains no regions of periodic packing of segments, or such regions are undetectable with a DSC measurement.

In one embodiment relating to modifying the surface properties of component A, component B may be a hydrophilic agent. Suitable hydrophilic agents of the present invention may include polyglycols such as poly(ethylene glycol) and poly(propylene glycol) and mixtures thereof. Other suitable materials may include EVOH, pentaerithritol, PVOH, polyvinylpyrollidine, vinylpyrollidone or poly(N-methyl pyrollidone), and saccharide based compounds such as glucose, fructose, and their alcohols, mannitol, dextrin, and hydrolyzed starch being suitable for the purposes of the present invention since they are hydrophilic compounds.

In another embodiment, suitable hydrophilic agents of the present invention may also include any hydrophilic material wherein the hydrophilic agent is heated above its melt point, and subsequently separates from component A to form the interconnecting channeled morphology of the present invention and thus, a two phase system of one phase having a majority of the water-insoluble polymer and the second phase having a majority of the hydrophilic agent and the particle.

In a further embodiment, component B may be composed of a material that has conventionally been used to coat the surface of a film or paper (e.g. label) to allow the film or paper to accept printing ink (e.g. polyvinyl chloride). For example, various types of materials are conventionally used to coat a film or paper so that the film or paper either: (a) will accept aqueous-based inks; (b) will allow the ink to quickly dry to the touch; and/or (c) will prevent the spread of small droplets. Thus, as a result of the interconnecting channels morphology of the present invention having the majority of component B in the channels, wherein channel B is composed of a material that advantageously effects the printing properties, the surface of the composition of the present invention may have similar properties as a film that has component B coated on the surface of the film. Consequently, the present invention eliminates the need for the additional coating step of component A because the modified surface properties of component A are "built-in" to the resulting composition.

In yet another embodiment, component B may be composed of a material that is conventionally used to coat the surface of a film or paper (e.g. label) to modify its adhesive properties (e.g. increase or decrease its peel strength). For example, component B may be composed of a material that either increases or decreases the adhesive strength of a base material when used with usual types of adhesives, such as acrylate based adhesives, natural rubber based adhesives, synthetic rubber based adhesives, such as polystyrene polybutadiene random copolymer (SBR), ethylene vinyl acetates (EVA), synthetic rubber adhesives based on block copolymers, such as polystyrene polybutadiene polystyrene (SBS) and polystyrene polyisoprene polystyrene (SIS), vinyl ether based adhesives, silicon based adhesives, polyurethane based adhesives, chlorinated adhesives, etc. In addition, the composition may be constructed so that, when pressure is applied to the composition (e.g. pushing on the composition), a portion of component B is directed to the surface of the composition (e.g. releasing a portion of the adhesive to the surface of the composition). The result is a composition that adheres to a desired material through the use of the adhesive (i.e. component B). One example of a composition is one composed of about 5% by weight of silica gel (component C), about 50% by weight of polyethylene (component A) and about 45% by weight of a synthetic rubber based adhesive (component B).

In an embodiment, component C may be composed of an "inert" particle—a particle that merely assists in the formation of the channels. An example of such a particle may include glass microspheres.

In one embodiment relating to modifying the surface properties of component A, the particle (i.e., component C) may be composed of one or more type of either an absorbing/releasing/activation material. Thus, in addition to modifying the surface properties of component A, component C may also provide the composition with a secondary benefit—absorbing/releasing/activation properties.

For example, component C may be an absorbing material. Absorbing material of the present invention may include one or more desiccating compounds. In general, there are three primary types of desiccating compounds that may be used with the present invention. The first type comprises chemical compounds that can combine with water to form hydrates. Examples of such desiccant are anhydrous salts which tend to absorb water or moisture and form a stable hydrate. The second type of desiccant compounds are those which are considered to be reactive. These compounds typically undergo a chemical reaction with water or moisture and form new compounds within which the water is combined. The third type of desiccants obtain their moisture absorbing capabilities through physical absorption. Examples of these physical absorption desiccants include molecular sieves, silica gels, clays (e.g. montmorillimite clay), certain synthetic polymers (e.g. those used in baby diapers), and starches. In one embodiment, the molecular sieve pore sizes that are suitable for use in the present invention include between about 3 to 15 Angstroms; about 3 to 5 Angstroms, about 5 to 8:3 Angstroms; 4 Angstroms; 5 Angstroms; 8 Angstroms and 10 Angstroms. In another embodiment, the pore size of silica gel is about 24 Angstroms.

In a further embodiment, component C may be composed of absorbing materials such as: (1) metals and alloys such as, but not limited to, nickel, copper, aluminum, silicon, solder, silver, gold; (2) metal-plated particulate such as silver-plated copper, silver-placed nickel, silver-plated glass microspheres; (3) inorganics such as $BaTiO_3$, $SrTiO_3$, $SiO_2$, $Al_2O_3$, ZnO, $TiO_2$, MnO, CuO, $Sb_2O_3$, WC, fused silica, fumed silica, amorphous fused silica, sol-gel silica, sol-gel titanates, mixed titanates, ion exchange resins, lithium-containing ceramics, hollow glass microspheres; (4) carbon-based materials such as carbon, activated charcoal, carbon black, ketchem black, diamond powder; and (5) crosslinked elastomers, such as polybutadiene and polysiloxane. In another embodiment, certain particles, that are conventionally added to materials to increase their electrical conductivity properties such as carbon black, may be used to increase the electrical conductivity of the surface of component A.

In yet another embodiment, the particle (i.e. component C) may be composed of a variety of releasing material. Such material may comprise any suitable form which will release dispersant to surrounding atmosphere, including solid, gel, liquid, and in some cases a gas. These substances can perform a variety of functions including: serving as a fragrance, flavor, or perfume source; supplying a biologically active ingredient such as pesticide, pest repellent, antimicrobials, bait, aromatic medicines, etc.; providing humidifying or desiccating substances; delivering air-borne active chemicals, such as corrosion inhibitors; ripening agents and odor-making agents, etc.

In yet another embodiment, the particle (i.e. component C) may be composed of various types of activation material. Generally, an activation material includes a composition that requires a specific liquid, vapor, or gas to activate the composition and, after activation, the composition releases the desired vapor, liquid, or gas. In one embodiment, moisture is used to activate the composition. In another embodiment, oxygen is used to activate the composition. In a further embodiment, an acid is used to activate the composition. In yet a further embodiment, a base is used to activate the composition. In yet another embodiment, a variety of materials may be released. Such material may comprise any suitable form which will release dispersant to surrounding atmosphere, including solid, gel, liquid, and, in some cases, a gas. These substances can perform a variety of functions, including: serving as a fragrance or perfume source; supplying a biologically active ingredient such as a biocide, antimicrobial agent, pesticide, pest repellent, bait, aromatic medicine, etc.; providing humidifying or desiccating substances; or delivering air-borne active chemicals, such as corrosion inhibitors, ripening agents and odor-masking agents.

In a further embodiment, activation material may also be added to provide component A with one or more specific properties at its surface and/or through the polymer, such as acidity, basicity, thermal conductivity, electrical conductivity, dimensional stability, low dielectric constant, high-dielectric constant, ion-exchange capabilities, galvanic potential, flame retardancy, etc.

It is understood that the surface characteristics of component A may be affected by any combination of the following: (a) the size of the individual particles (i.e. component C); (b) the compositional make-up of component C; (c) the amount of component C (e.g. about 5 to 10 to 15 to 20 to 25 to 30% by weight of the total composition); (d) the compositional make-up of component B; and (e) the amount of component B (e.g. about 10 to 20 to 30 to 40 to 50 to 60% by weight of the total composition).

With respect to component A, in one embodiment, component A may be a water-insoluble polymer such as a thermoplastic material. Examples of suitable thermoplastic materials may include polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly (vinyl chloride), polystyrene, polyesters, polyanhydrides, polyacrylonitrile, polysulfones, polyacrylic ester, acrylic, polyurethane and polyacetal, or copolymers or mixtures thereof. Another example is thermoset material. In an additional embodiment, component B may be a hydrophobic agent. For purposes of the present invention, the term "hydrophobic agent" is defined as a material that has a solubility in water of less than about 1% at 25° C. and atmospheric pressure.

In yet another embodiment, components A, B and C may be first dry mixed in a mixer such as a Henschel, and then fed to a compounder. A Leistritz twin screw extruder, for example, or a Werner Pfleider mixer can be used to achieve a good melt mix at about 140° C. to about 170° C. The melt can then be either extruded to form, for example, a film, sheet or other shaped article or converted into pellets, for example, using dry air cooling on a vibrating conveyer. The formed pellets, containing channels, can, for example, then be injection molded into beads, sieves, or other shaped articles.

Moreover, in a further embodiment, it is believed that a composition may be formed having channels composed of two discrete polymers (e.g. phases with a majority of components B and B' respectively) with each type of channel composed of a majority of either the same particles (e.g. component C) or different particles (e.g. components C and C') where B/B' and C/C' are selected, among other characteristics, based on their preferential affinities with each other. For example, a composition may be formed, wherein: (a) component A is a semicrystalline polymer; (b) component B and B' are polymers; (c) components A, B and B' are immiscible within each other; (d) components C and C' are particles; (e) the volume fraction of component A represents at least about 34% by volume of the total volume of components A, B, B', C and C'; (f) the preferential affinity between components B and C is greater than either between components A and C and between components B' and C; (g) the preferential affinity between components B' and C' is greater than either between components A and C' and between components B and C'; (h) at least three phases are formed, one phase is composed of a majority of component A, the second phase is composed of a majority of component B and a majority of component C, and the third phase is composed of a majority of components B' and a majority of components C'; and (i) at least three phases form the co-continuous interconnecting channel morphology. It is further believed that such a composition could be designed to have multiple characteristics. For example, a select channel morphology with a specific component B, which is selected for its moisture transmission properties, could have high moisture transmission properties with a majority of desiccants residing in these channels and another channel morphology with a specific component B', which is selected for its desired surface properties, within the same composition could result in the desired surface properties. In addition, as another example, additional channel morphologies may also be designed using additional components (e.g. components B", B''' , . . . and C", C''' . . . ). Moreover, in another example, a desired channel morphology with a specific component B', which is selected for its desired surface properties (e.g. printing ability), could readily accept a specific type of ink and a second channel morphology within the same composition with a specific component B, which is selected for its desired surface properties (e.g. adhesive ability), could also increase the adhesive properties of component A.

In yet a further embodiment, because the composition of the present invention may be less durable than component A without components B and C, the overall shaped article may be molded so that one portion of the article is the composition of the present invention while the other portion is formed from pure polymer or the composition of the present invention with a lower loading level of components B and/or C. For example, a package having an exterior portion composed of the composition of the present invention and an interior portion composed of pure polymer typically may not only be more durable and less brittle, but may also have the additional properties of the pure polymer.

The composition of the present invention has numerous applications. The following examples are merely exemplary and are not meant to limit the application of the present invention. For example, the surface properties of component A may be modified by using the present invention to provide similar results as are presently achieved with pressure sensitive release coatings. In one embodiment, component B may be composed of a similar material as the pressure sensitive release coating. In another example, a so-called "smart label" could be produced by employing the present invention where the label could have multiple functions such as changing color based on a set condition (e.g. time, temperature, humidity), releasing a gas (e.g. a fragrance), providing electrical properties, providing adhesive strength on the surface and/or more readily accepting a specific type of ink.

In yet another embodiment, the surface properties of the composition of the present invention may be modified to be produce low cost films as thermal ink jet media. Specifically, by selecting components A, B and C, a film may be produced that would accept aqueous-based inks and be capable of becoming quickly dry to the touch. As another example, the composition of the present invention may be used to improve the printing function and/or ink absorption of component A (e.g. embossing or printability).

In yet another embodiment, composition of the present invention may be used to form sheeting that, in one embodiment, is joined with another sheet. In at least one embodiment, the sheets are effectively laminated one to the other so that one layer may be established adjacent to the composition of the present invention. In one example, the laminate sheet may then be used to wrap an item. One means by which the joinder process may be accomplished is through a thermal extrusion procedure.

In each of the embodiments of the present invention described herein, advantages and enhancements over the prior art methods and structures stem from the discovery of the ability to create a co-continuous interconnecting channel morphology throughout the composition of the present invention so that a shaped article may be constructed from the composition of the present invention. Furthermore, in one embodiment, the discovery of employing component B that acts on the surface properties of the composition and thus, greatly enhances the composition's ability to be used in various applications without the need for an additional coating layer.

One embodiment of the present invention includes a process for producing the composition of the present invention. In one embodiment, the process comprises blending a component A (e.g. water-insoluble polymer) and a component B. Either prior to, at the time of, or after blending component B, component C is blended into the polymer so that component C is uniformly distributed within component A and component B. Subsequently, the result is that a majority of components B and C reside in the interconnecting channels in the composition. In another embodiment, component A, component B and component C are all thoroughly mixed in dry powder form, and then the blend formed into a desired shape article. A co-continuous interconnecting channel morphology is formed in the composition.

Figure 2:
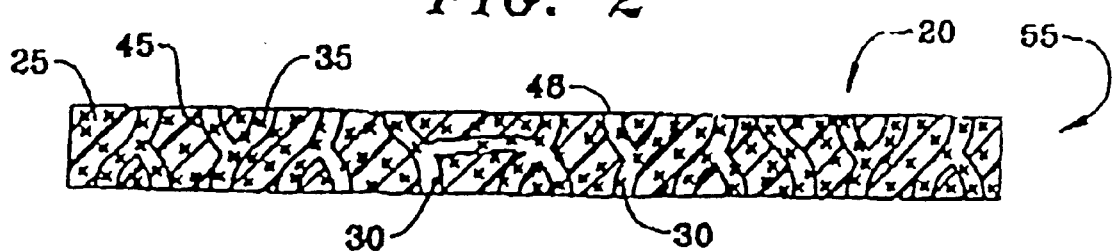
FIG. 2 is an exaggerated, cross-sectional view of a solidified shaped article formed from component A having components B and C blended therewith.

Referring to FIG. 1 of the accompanying drawings of an embodiment of the present invention, a shaped article constructed from the composition of the present invention 20 is illustrated. For purposes of this disclosure of the present invention, the words "entrain" and "contain" have been used interchangeably when referring to the inclusion of component C 30 in composition 25. Referring to FIG. 2, a cross-sectional view is shown of the shaped article 55 that has been constructed from a polymer mixture comprising component A (25) that has been uniformly blended with component C (30) and component B (35). In the illustration of FIG. 2, the composition of the present invention has been solidified so that the co-continuous interconnecting channel morphology 45 so that passages are formed throughout the composition 55. As may be appreciated in both FIGS. 1 and 2, the passages terminate in channel openings 48 at an exterior surface of the shaped article 55.

Figure 3:
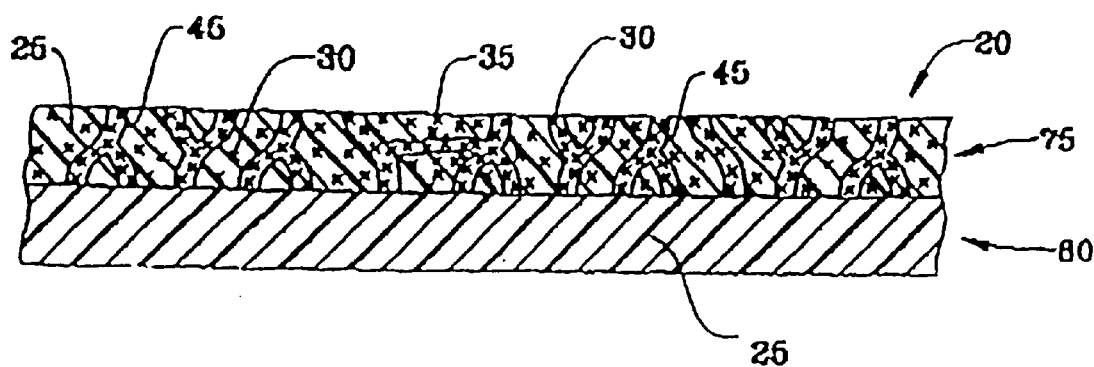
FIG. 3 is an exaggerated cross-sectional view of the composition of the present invention formed into a sheet located adjacent to a barrier sheet constructed from a polymer.

FIGS. 3 illustrates an embodiment of the invention in which a sheet of the present invention 75 is created for combination with a secondary sheet 80. The characteristics of the sheets are similar to those described with respect to the shaped article 55. That is, FIG. 3 illustrates an embodiment in which the two sheets 75, 80 are separately produced, and later combined to form a composite sheet having the desired surface property characteristics at the surface 75. It is contemplated that the separate sheets 75, 80 of FIG. 3 may be joined together with an adhesive or other suitable means to form a laminate from the plurality of sheets 75, 80. Alternatively, the sheeting 75, 80 may be manufactured from a thermal extrusion process whereby both sheets 75, 80 are manufactured at the same time and effectively comolded together.

The present invention will be illustrated in greater detail by the following specific examples. It is understood that these examples are given by way of illustration and are not meant to limit the disclosure or claims. Moreover, these examples are meant to further demonstrate that the present invention has a co-continuous interconnecting channel morphology and that component B predominately resides in the interconnecting channels. All percentages in the examples or elsewhere in the specification are by weight unless otherwise specified.

EXAMPLE 1

The purpose of the following example is to demonstrate that the composition of the present invention has the co-continuous interconnecting channel morphology by subjecting the following materials to a swelling and weight loss analysis.

A. Preparation of Samples

Film #1: A blend of about 93% (w/w) of polypropylene (Exxon Chemicals, tradename Escorene® polypropylene 3505G) and about 7% (w/w) of poly(ethylene glycol) (Dow Chemical, tradename E-4500) was sufficiently mixed to produce a uniform blend. The blend was then fed through a Leistritz twin screw extruder at temperatures in the sixteen zones ranging from about 145° C. to about 165° C., at a feed rate of about 40 lbs/hr, at a screw speed of about 460 rpm and a six inch die. The extruded composition was then fed through a three roll hot press at temperatures ranging from about 85° C. to about 92° C. to produce a film of about 4 mil.

Film #2: A blend of about 68% (w/w) of polypropylene (Exxon Chemicals, tradename Escorene® polypropylene 3505G) and about 3505G), about 12% (w/w) of poly(ethylene glycol) (Dow Chemical, tradename E-4500) and about 20% (w/w) of a desiccant of molecular sieve (Elf Atochem, tradename Siliporite® molecular sieve, 4 Angstrom) was sufficiently mixed to produce a uniform blend. The blend was then fed through a Leistritz twin screw extruder at temperatures in the sixteen zones ranging from about 145° C. to about 165° C., at a feed rate of about 40 lbs/hr at a screw speed of about 460 rpm and a six inch die. The extruded composition was then fed through a three roll hot press at temperatures ranging from about 85° C. to about 92° C. to produce a film of about 4 mil.

Film #3: A blend of about 34.88% (w/w) of polypropylene (Exxon Chemical, tradename Escorene® polypropylene 3505G), about 11.96% (w/w) of poly(ethylene glycol) (Dow Chemical, tradename E-4500), about 52.82% (w/w) of a desiccant of molecular sieve (Elf Atochem, tradename Siliporite® molecular sieve, 4 Angstrom) and about 0.34% (w/w) of a grey colorant was sufficiently mixed to produce a uniform blend. The blend was then fed through a Leistritz twin screw extruder at temperatures in the sixteen zones ranging from about 145° C. to about 165° C., at a feed rate of about 50 lbs/hr at a screw speed of about 460 rpm and a six inch die. The extruded composition was then fed through a three roll hot press at temperatures ranging from about 85° C. to about 92° C. to produce a film of about 4 mil.

B. Swelling And Weight Loss Analysis

Figure 9:
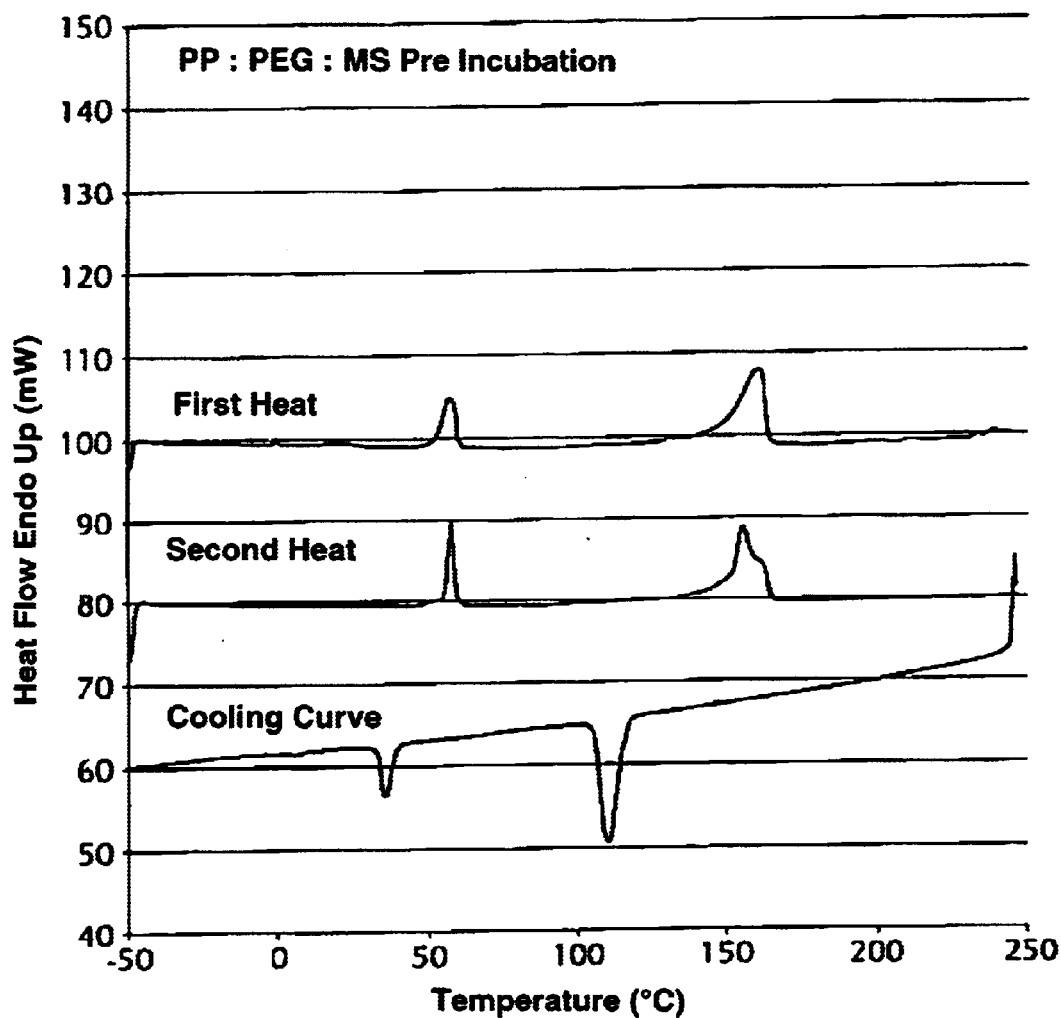
FIG. 9 is a graphical view of a DSC curve of a sample of Film #2 in a pre-incubation state.

Circular disks (OD 1.1 cm) were cut from each of the three samples. Initial dry weights of each sample was recorded. Samples were subsequently incubated in 2.0 ml distilled water and left shaking at room temperature. Periodically at 1, 2, 3, and 34 days, the disks were removed, the surface blotted dry and the sample weighed, to determine the extent of swelling. At each timepoint, the distilled water was replaced to provide for sink conditions. At the end of the study, the samples were lyophilized to remove the water and the sample weighed to determine mass loss. FIG. 9 is a graph of the result of the analysis. Percent swelling is defined as the wet weight at a time point (t), divided by initial dry weight (zero) and multiplied by 100. 'Dry' indicates the final lyophilized sample weight following the 34 day incubation.

Figure 4:
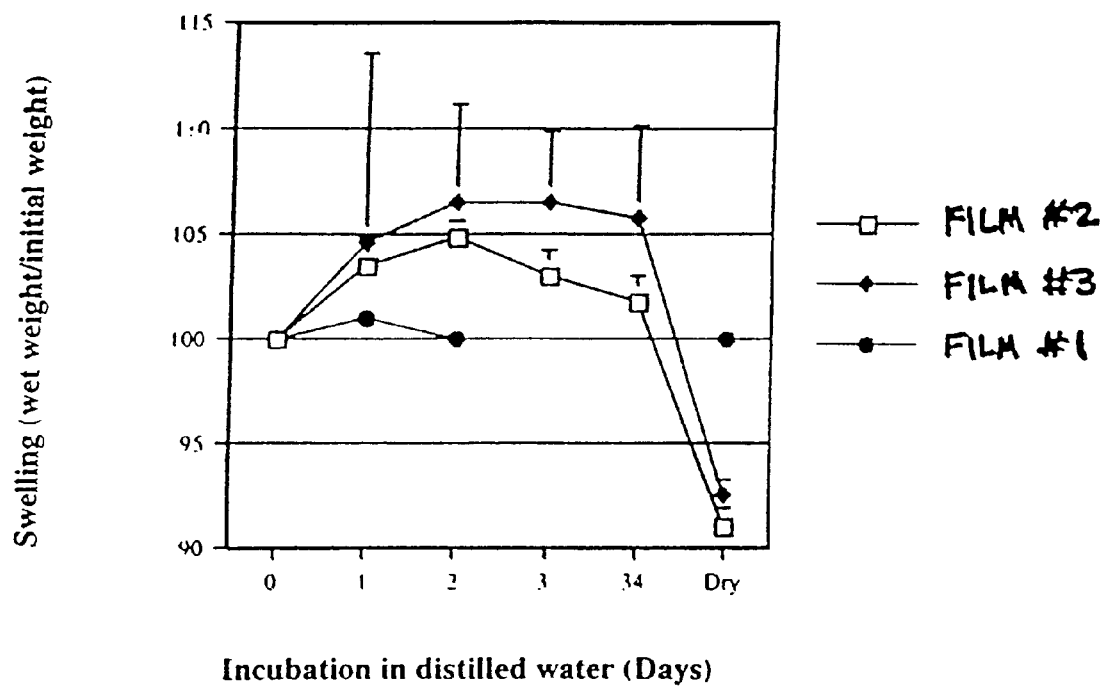
FIG. 4 is a graphical view of a swelling and weight loss analysis of three film samples: Film #1, Film #2 and Film #3.

FIG. 4 shows film #1 did not swell or lose weight over the course of 34 days. Thus, it is believed that this result shows that the poly(ethylene glycol) (i.e., hydrophilic agent) was completely entrapped in the polypropylene (i.e., water-insoluble polymer). Film #2 gained approximately 3% of its initial weight by swelling and lost approximately 9% of its initial weight at the end of the 34 days of incubation. Film #3 gained approximately 6% of its initial weight and lost approximately 8% of its initial weight at the end of the 34 day incubation period. These results demonstrate that interconnecting channels from the exterior through the interior exist in the composition of the present invention because water penetrated films #2 and #3 and a substantial portion of the water soluble component (e.g., poly(ethylene glycol)) of films #2 and #3 was extracted from the polymer.

EXAMPLE 2

The purpose of the following example is to demonstrate that the composition of the present invention has two separate phases consisting of a component A (e.g. water-insoluble polymer) and component B (e.g. hydrophilic agent).

A. Preparation Of Samples

Film #4: 100% polypropylene (Exxon Chemicals, tradename Escorene® polypropylene 3505G) was fed through a Leistritz twin screw extruder at temperatures in the sixteen zones ranging from about 145° C. to about 165° C., at a feed rate of about 40 lbs/hr, at a screw speed of about 460 rpm and a six inch die. The extruded composition was then fed through a three roll hot press at temperatures ranging from about 85° C. to about 92° C. to produce a film of about 4 mil.

Film #5: A blend of about 88% (w/w) of polypropylene (Exxon Chemicals tradename Escorene® polypropylene 3505G), about 12% (w/w) of poly(ethylene glycol) (Dow Chemical, tradename E-4500) was sufficiently mixed to produce a uniform blend. The blend was then fed through a Leistritz twin screw extruder at temperatures in the sixteen zones ranging from about 145° C. to about 165° C., at a feed rate of about 40 lbs/hr, at a screw speed of about 460 rpm and a six inch die. The extruded composition was then fed through a three roll hot press at temperatures ranging from about 85° C. to about 92° C. to produce a film of about 4 mil.

Film #6: A blend of about 68% (w/w) of polypropylene (Exxon Chemicals, tradename Escorene® polypropylene 3505G), about 12% (w/w) of poly(ethylene glycol) (Dow Chemical, tradename E-4500) and about 20% (w/w) of a desiccant of molecular sieve (Elf Atochem, tradename Siliporite® molecular sieve, 4 Angstrom) was sufficiently mixed to produce a uniform blend. The blend was then fed through a Leistritz twin screw extruder at temperatures in the sixteen zones ranging from about 145° C. to about 165° C., at a feed rate of about 12 lbs/hr, at a screw speed of about 460 rpm and a six inch die. The extruded composition was then fed through a three roll hot press at temperatures of about 105° C. to produce a film of about 4 mil.

B. Thermal Analysis Using Differential Scanning Calorimetry ("DSC")

The processed film samples were analyzed using a Perkin Elmer DSC7 equipped with a TAC 7DX thermal controller. Data were analyzed using Perkin Elmer Pyris software (version 2.01). Samples were heated from −50 to 250° C. at a rate of 10 or 15° C./min, then cooled at the same rate and then heated once again to 250° C. at the same rate. The following table is the date collected from the DSC. The melting point data is given as the melting point peak (° C.) and enthalpy (ΔH, joules/gm) for the first heating ramp (1°) and the second heating ramp (2°). The column referring to FIGS. 10 through 18 is the graphical output from the DSC that corresponds to the date from the table. Since the samples are only heated to 250° C., the molecular sieve in film samples #2, #3 and #7 was not melted and thus, no melting point date was recorded.

Figure 5:
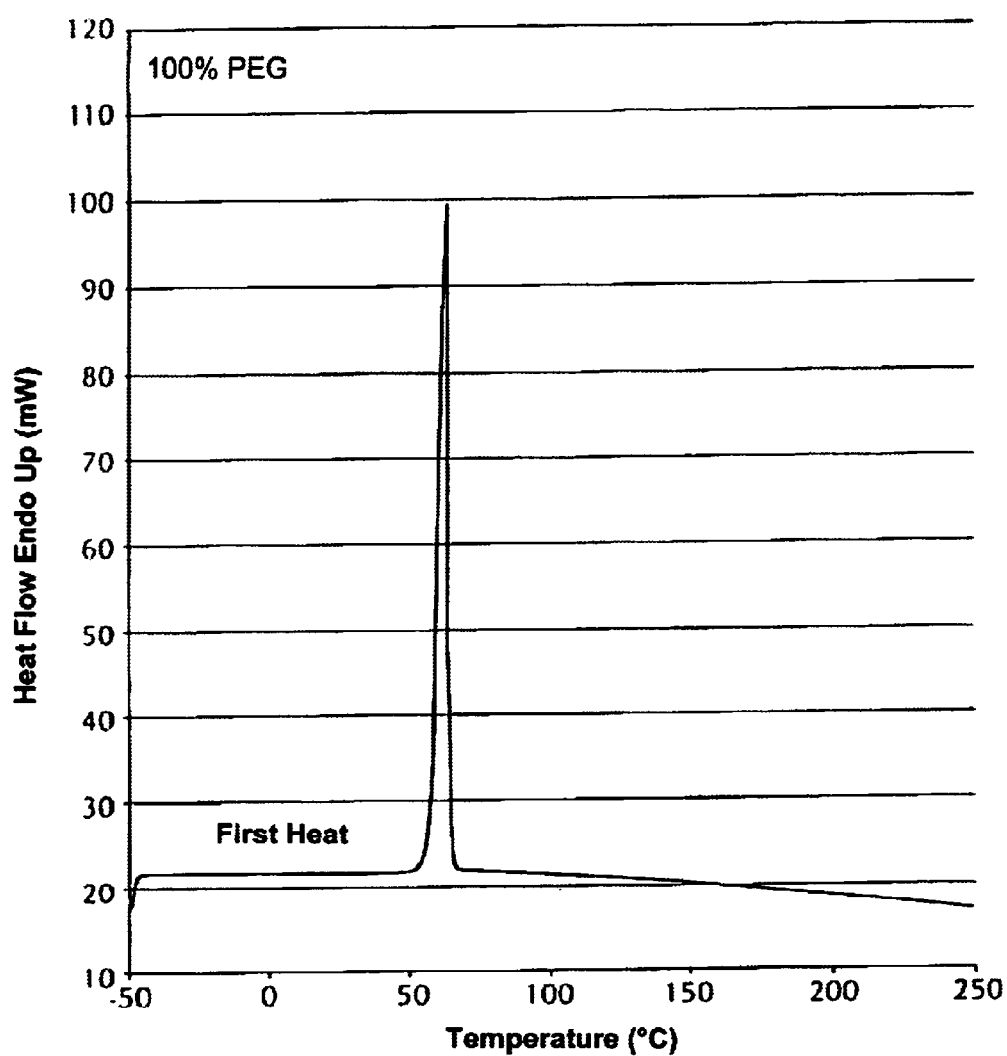
FIG. 5 is a graphical view of a DSC curve of a sample of 100% polyglycol.
Figure 6:
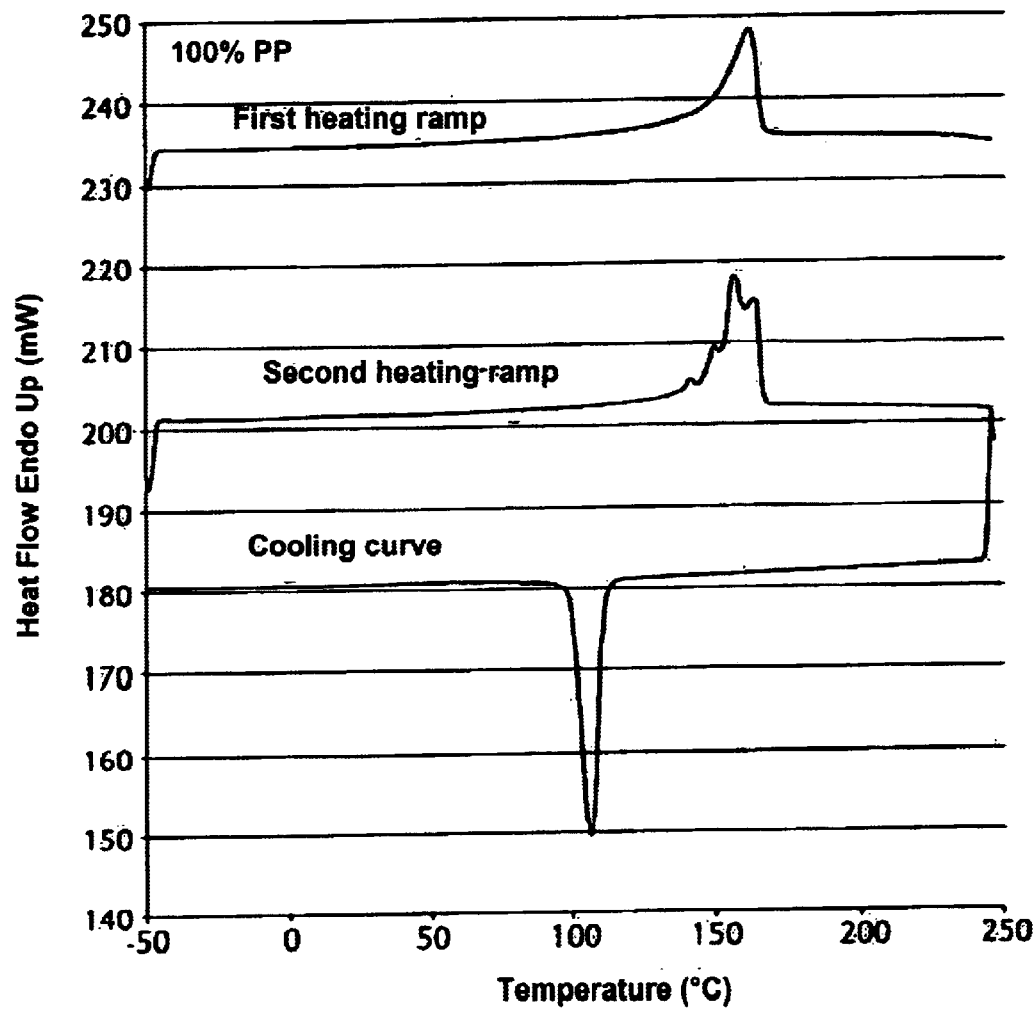
FIG. 6 is a graphical view of a DSC curve of a sample of Film #4.
Figure 7:
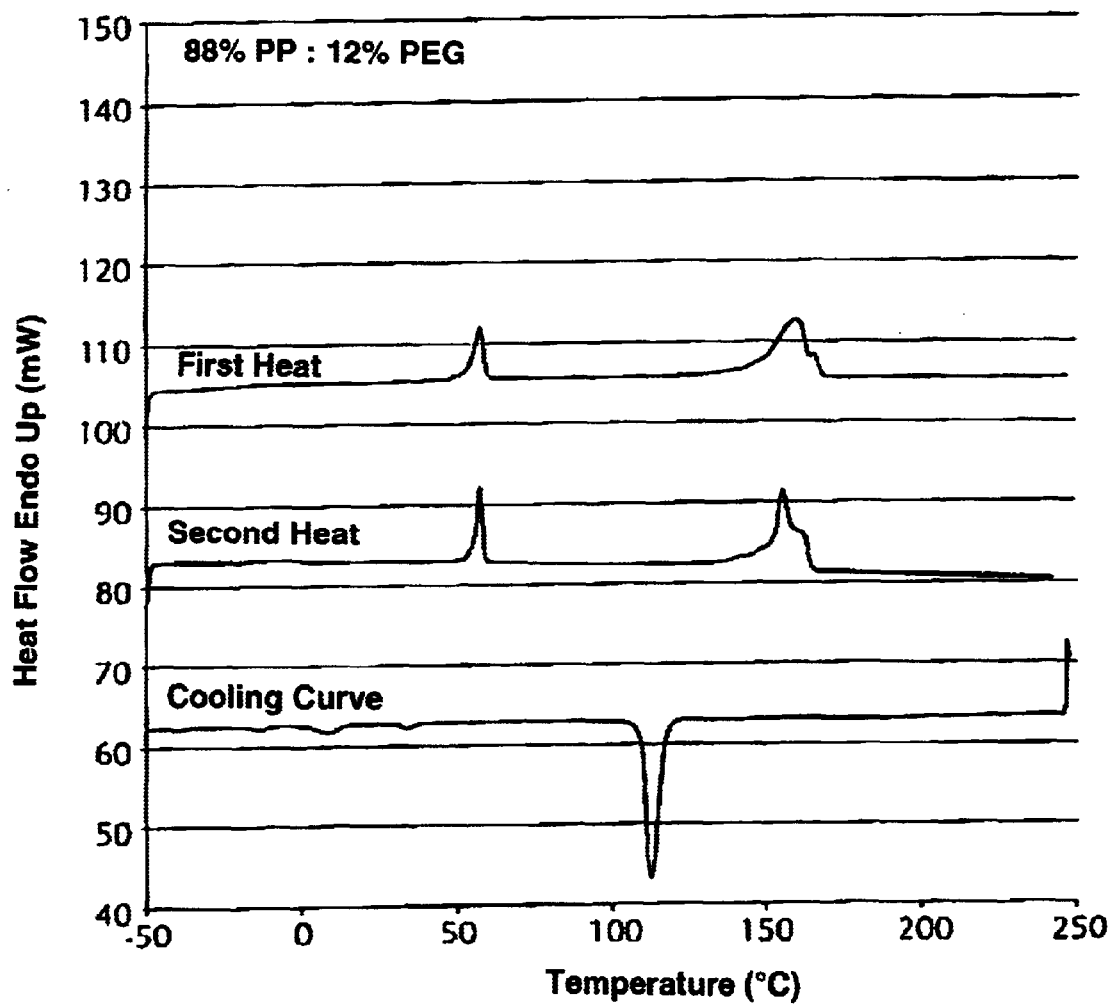
FIG. 7 is a graphical view of a DSC curve of a sample of Film #5.
Figure 8:
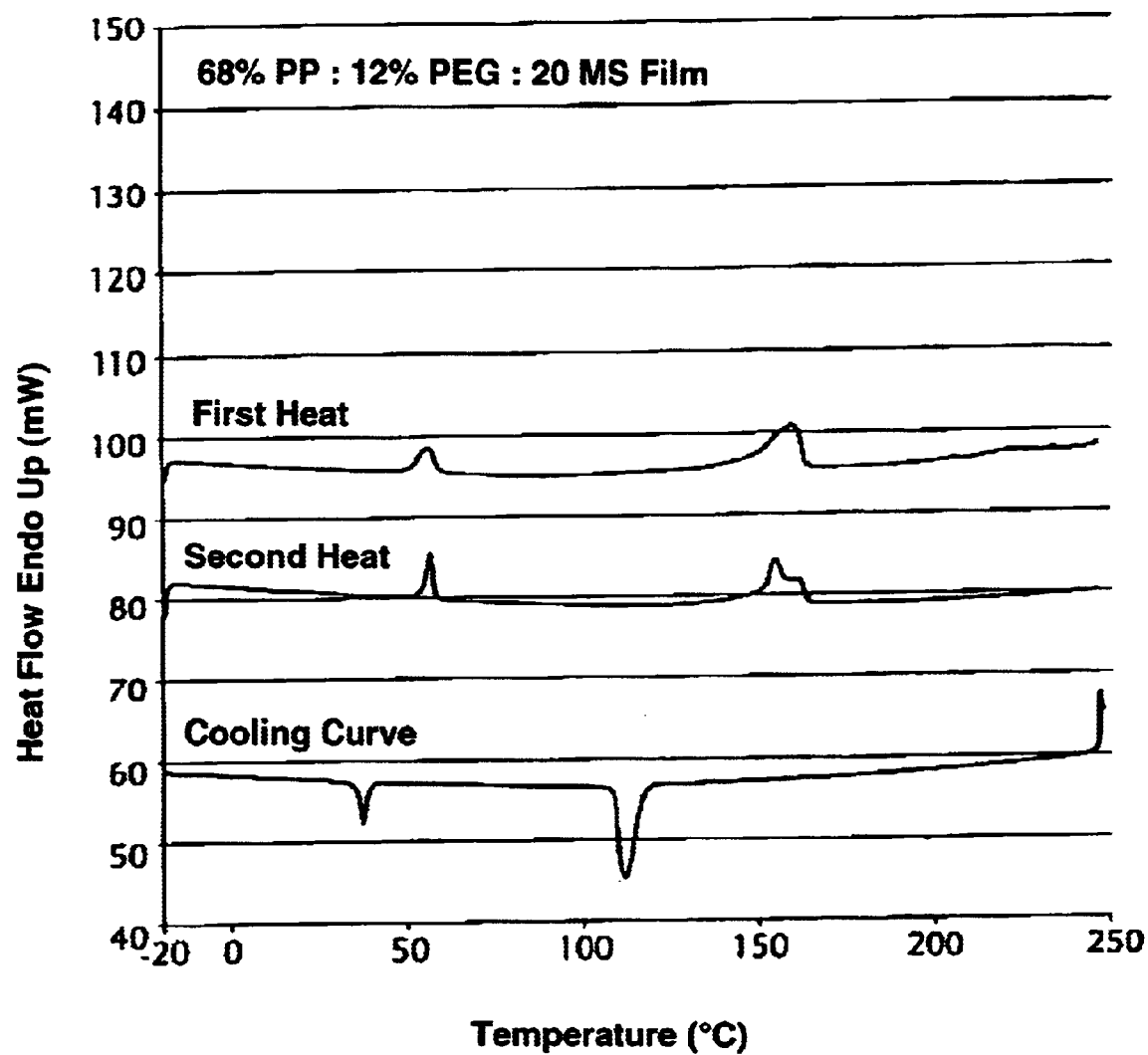
FIG. 8 is a graphical view of a DSC curve of a sample of Film #6.
Figure 10:
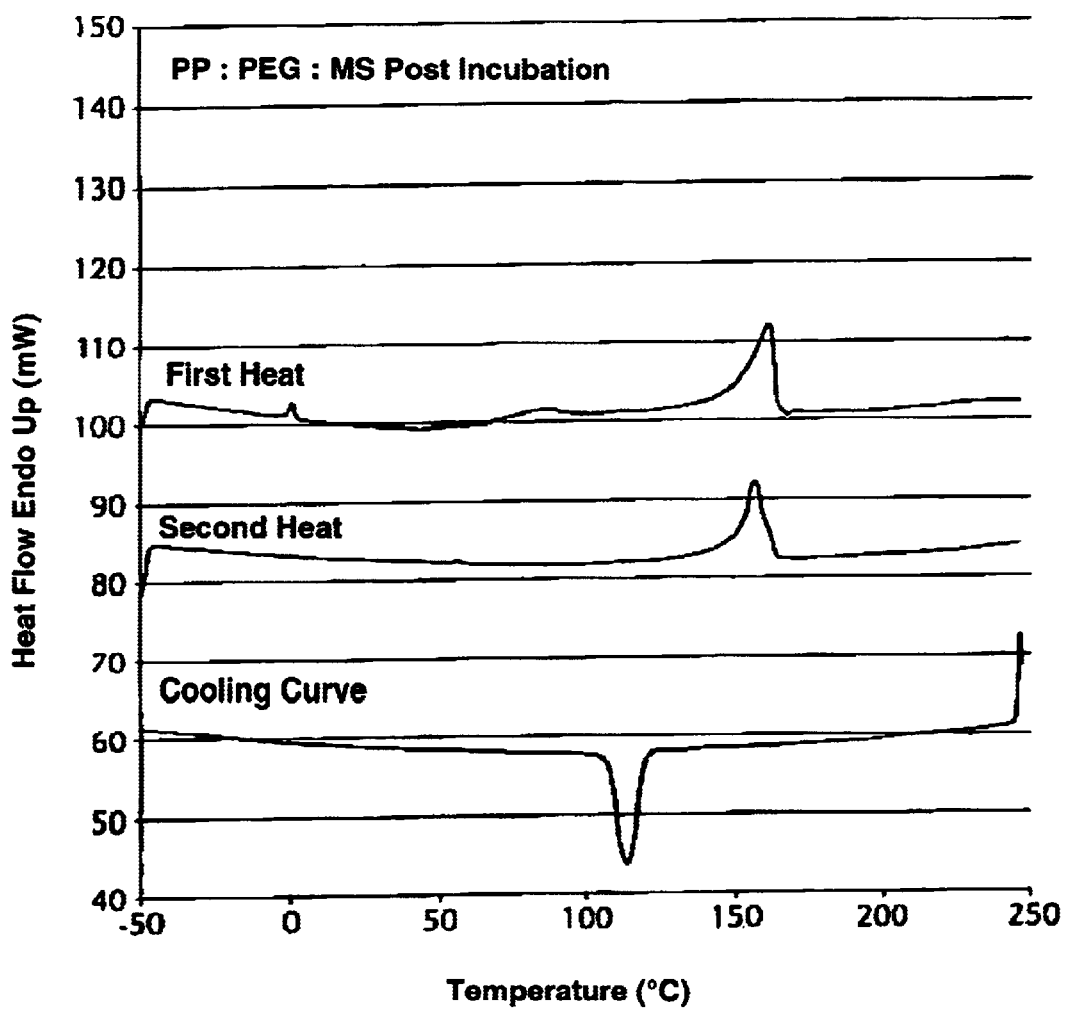
FIG. 10 is a graphical view of a DSC curve of a sample of Film #2 in a post-incubation state.
Figure 11:
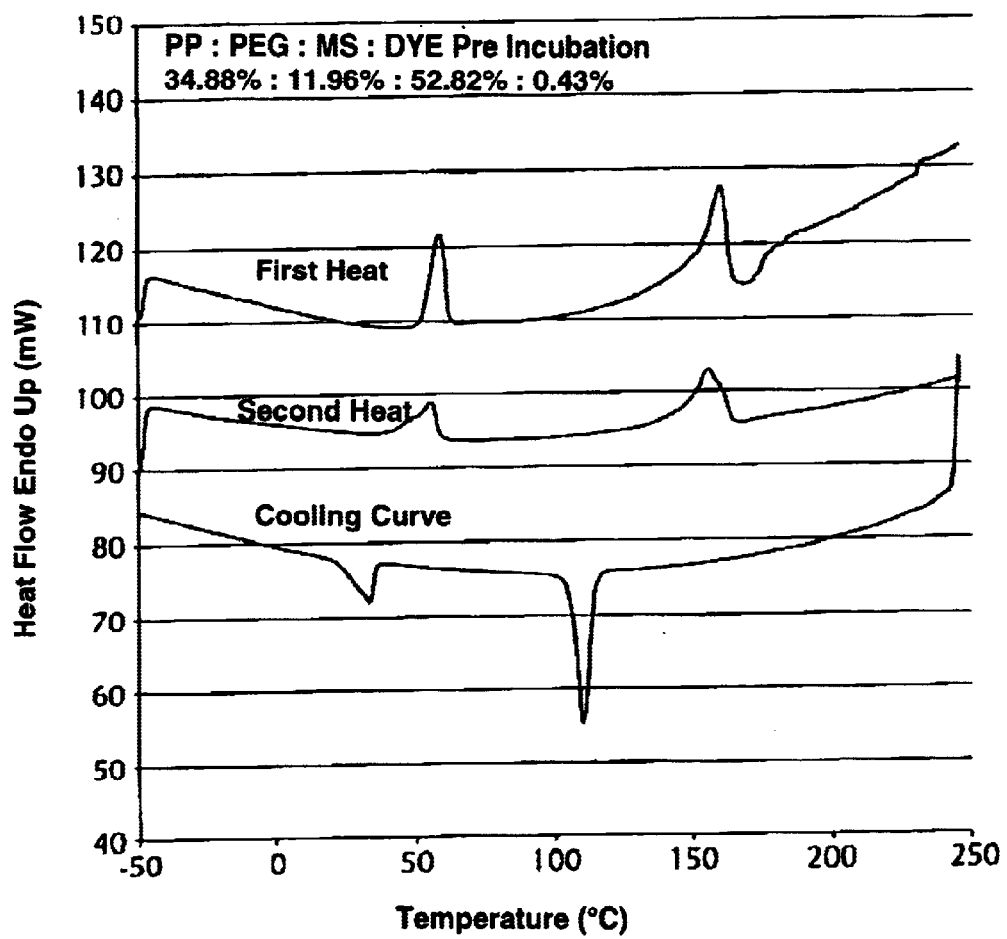
FIG. 11 is a graphical view of a DSC curve of a sample of Film #3 in a pre-incubation state.
Figure 12:
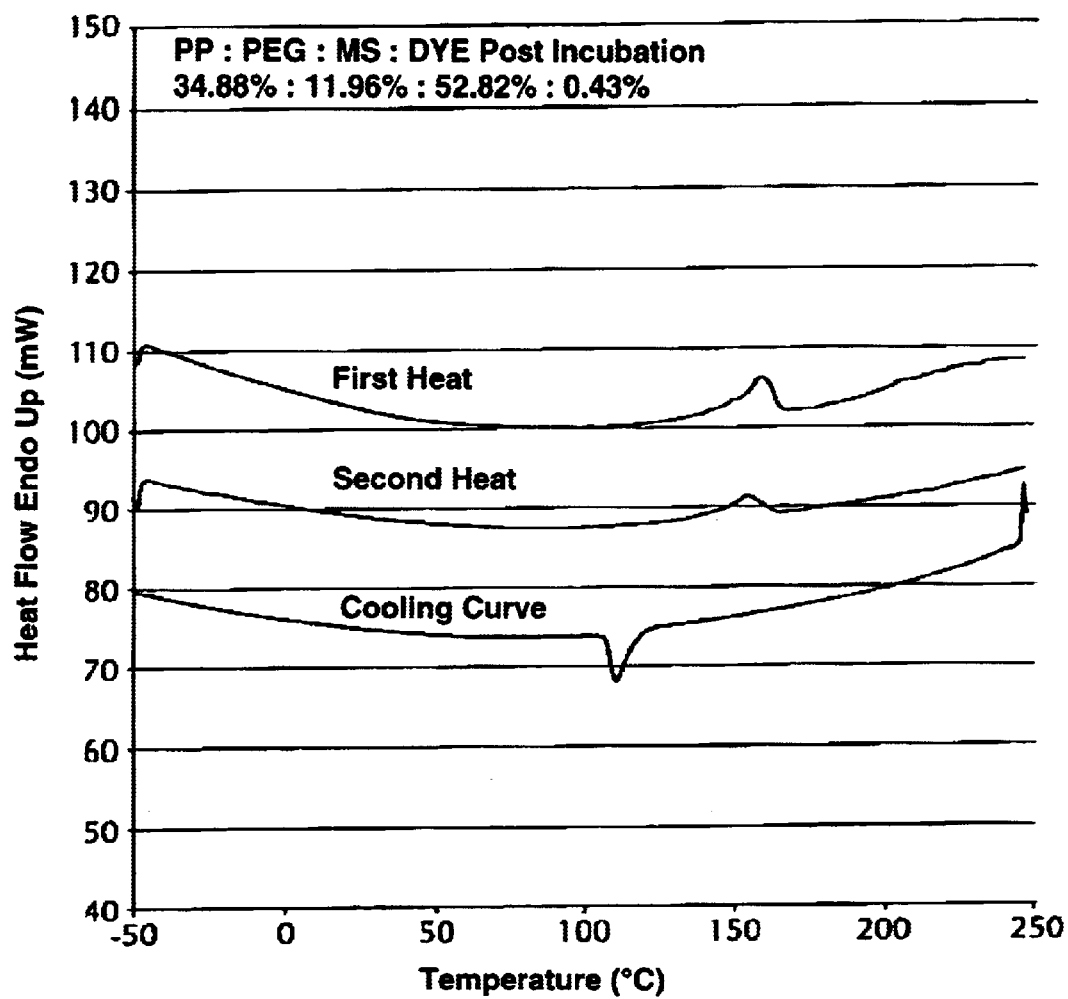
FIG. 12 is a graphical view of a DSC curve of a sample of Film #3 in a post-incubation state.

| Sample | FIG. # | PEG Peak ° C. | PEG ΔH J/g | PP Peak ° C. | PP ΔH J/g |
|---|---|---|---|---|---|
| 100% poly-(ethylene glycol) | FIG. 5 | 1° 63.808 | 190.362 | none | none |
| Film #4 | FIG. 6 | 1° none | none | 162.700 | 78.462 |
|  |  | 2° none | none | 157.200 | 96.123 |
| Film #5 | FIG. 7 | 1° 57.700 | 22.253 | 161.700 | 80.524 |
|  |  | 2° 58.033 | 20.361 | 157.366 | 79.721 |
| Film #6 | FIG. 8 | 1° 56.366 | 19.460 | 162.200 | 70.073 |
|  |  | 2° 57.200 | 17.094 | 156.866 | 58.038 |
| Film #2 [pre-incubation] | FIG. 9 | 1° 58.554 | 20.845 | 163.062 | 60.577 |
|  |  | 2° 58.779 | 16.037 | 157.783 | 53.706 |
| Film #2 [post-incubation] | FIG. 10 | 1° 55.804 | 0.379 | 163.062 | 86.215 |
|  |  | 2° 57.529 | 0.464 | 158.533 | 67.949 |
| Film #3 [pre-incubation] | FIG. 11 | 1° 59.308 | 18.849 | 162.562 | 40.291 |
|  |  | 2° 56.529 | 10.122 | 158.283 | 24.980 |
| Film #3 [post-incubation] | FIG. 12 | 1° 55.554 | 0.138 | 160.562 | 46.931 |
|  |  | 2° none | none | 156.033 | 26.081 |

The 100% poly(ethylene glycol) sample, exhibits a single melting point at 63° C. while film #4 100% polypropylene has a melting point at 157° C. Film #5 displayed both peaks at 58° C. (poly(ethylene glycol)) and 157° C. (polypropylene), which indicates that the two polymers were phase separated. If the polymers were not phase separated but mixed, then the peaks would not be at the melt temperatures of the pure polymers, but shifted. Film #6 shows only the distinct polypropylene peak at 160° C. The molecular sieves do not melt in this temperature range or affect the melting temperature of pure polypropylene. Film #7 again shows two distinct peaks: one for poly(ethylene glycol) at 57° C. and one for polypropylene at 157° C. indicating that in the three component mixture, all are phase separated.

Film samples #2 and 3 were part of the swelling and weight loss analysis presented in Example 1. Once again two distinct peaks were evident: one for poly(ethylene glycol) at 59° C. and one for polypropylene at 158° C. indicating that in the three component mixture, all components were phase separated. However when the polymer film was incubated in water for 34 days at room temperature (File #2: post-incubation) and tested by DSC, the positions of the peaks remained the same indicating the components were still phase-separated. However the area of the poly(ethylene glycol) peak (indicated by delta H, enthalpy) was greatly reduced. This result indicated that poly(ethylene glycol) had been extracted by the prolonged water incubation. Also, the result provided further confirmation for the weight loss data presented in Example 1 and demonstrated that the poly(ethylene glycol) component was mostly extracted by means of interconnecting channels in the bulk polypropylene matrix.

Film sample #3 showed the same effect as Film sample #2. The polypropylene delta H peak was not detectable (Film #3: post-incubation), demonstrating nearly complete extraction of poly(ethylene glycol) during water incubation. This confirmed the weight loss result of Example 1 in which the same film lost approximately 8% of it's initial weight. The poly(ethylene glycol) composition of the sample was approximately 12% (w/w).

In addition, the glass transition ($T_g$) analysis from the DSC data of the samples of the present invention also demonstrate that the water-insoluble polymer and the material exist in separate phases. Pure polypropylene exhibits a $T_g$ of about −6° C. while pure poly(ethylene glycol) exhibits a $T_g$ at about −30° C. DSC data from film #5 exhibit two distinct $T_g$'s, which correspond to the respective polymers (6° C. for polypropylene and −30° C. for poly(ethylene glycol) and thus, indicates, further that the two components are phase separated.

EXAMPLE 3

The purpose of the following example is to demonstrate that the composition of the present invention has a co-continuous interconnecting channel morphology and has component C intermixed within component B.

A. Scanning Electron Microscopy ("SEM") Method

The structural properties of the films was imaged using a Hitachi S-2700 microscope operating at 8 kV accelerating voltage to minimize irradiation damage. Each film sample was visualized in three perspectives: 1) the film surface; 2) the fractured film cross-section (0°) and 3) the fractured film cross-section at a 90° angle with respect to orientation #2 (90°). Pre-incubation film samples were directly sputter coated with a 5–10 nm layer of gold-palladium with a Polaron Instruments Sputter Coater E5100. Post-incubation samples were incubated at room temperature for 24 hrs in 10 ml of 70% ethanol (w/v) with agitation. The ethanol was discarded and the samples were air-dried overnight. Samples were then frozen and lyophilized overnight to remove any residual moisture and then sputter coated.

Figure 13A:
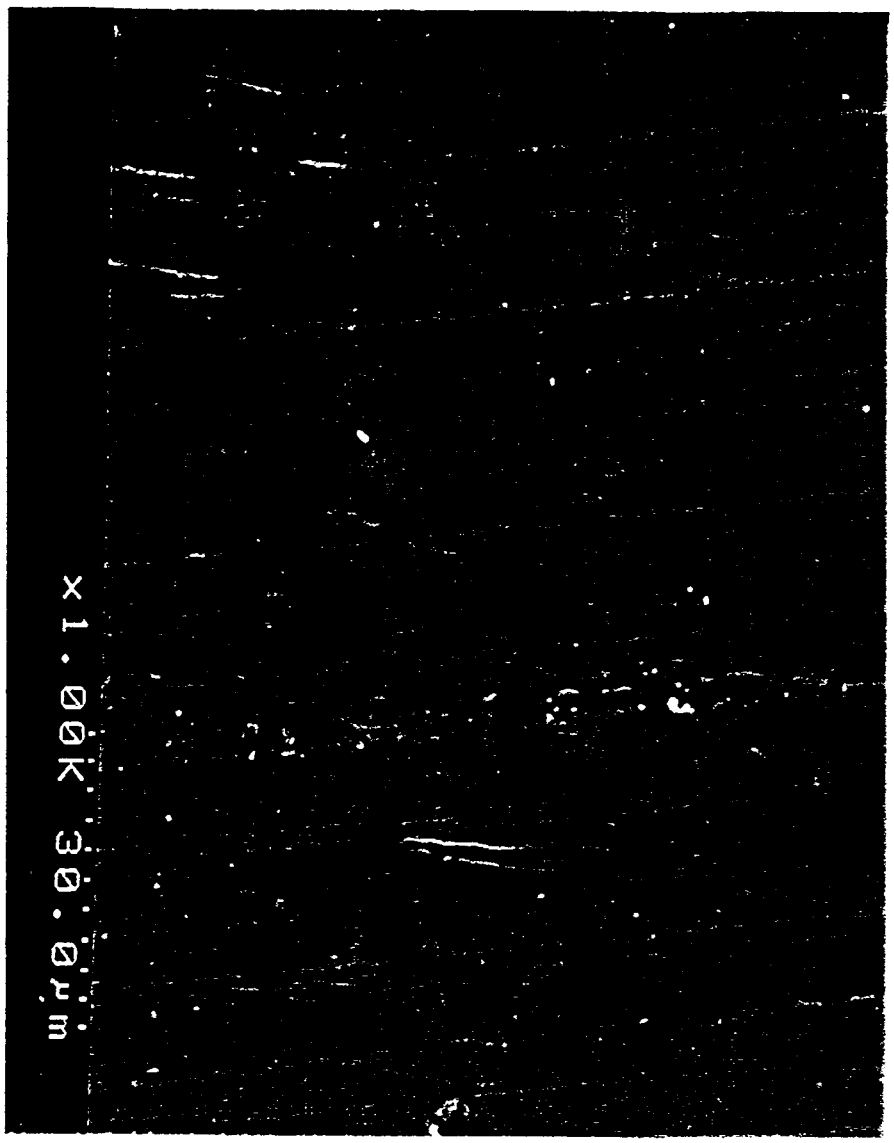
FIG. 13a–c are scanning electron photomicrographs of a film sample of Film #4.
Figure 13B:
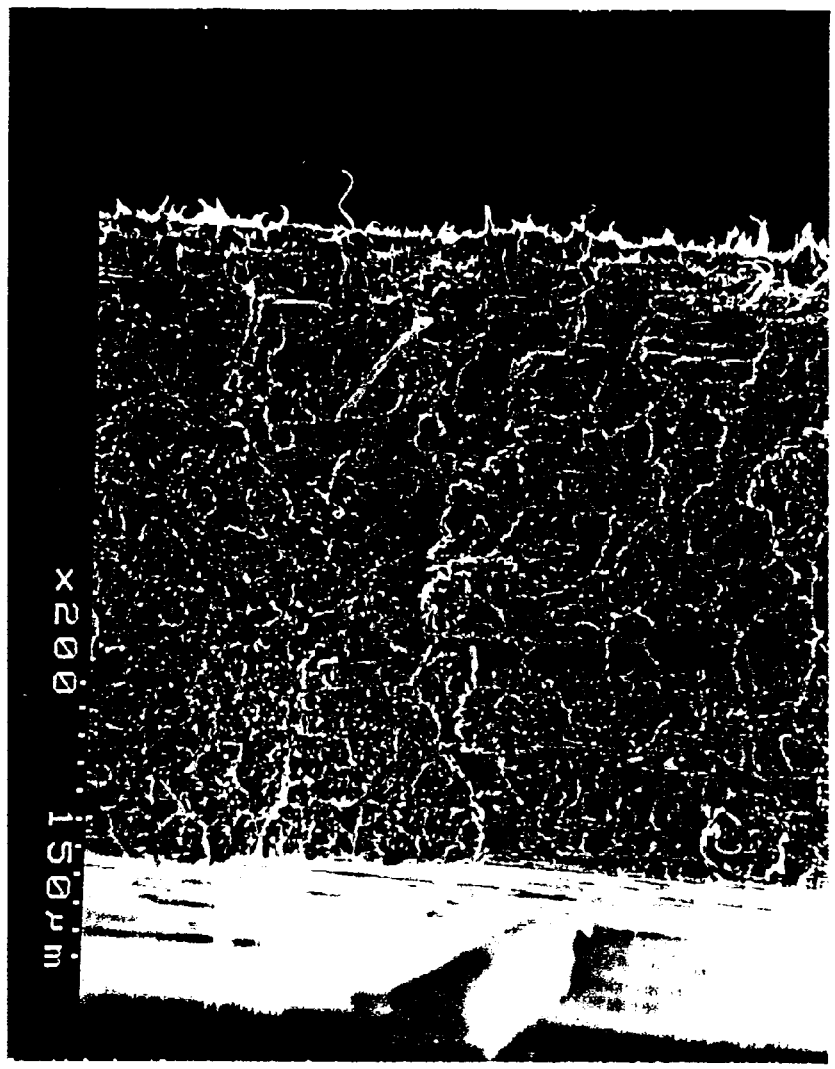
Figure 13C:
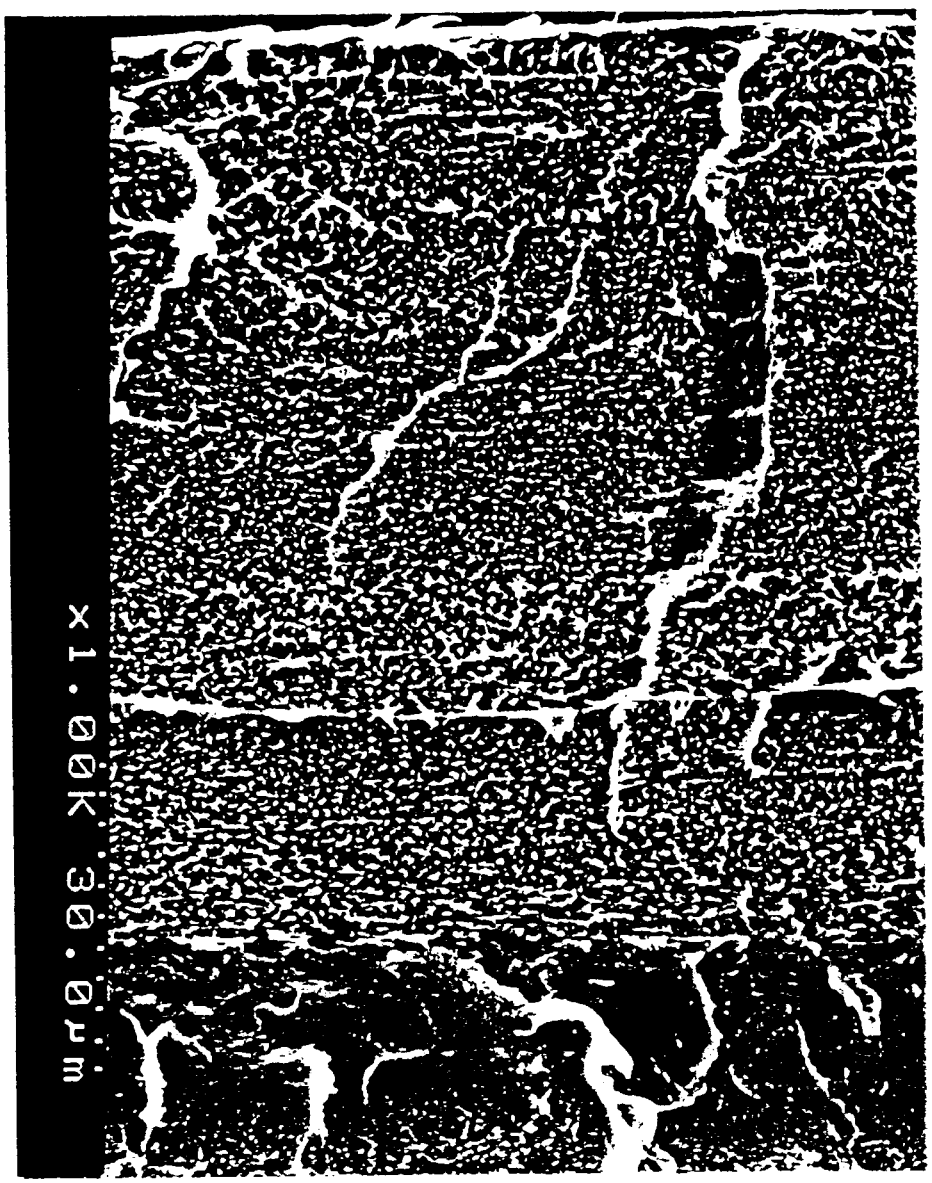

B. Morphology of Film Samples:

FIGS. 13a–c are scanning electron photomicrographs of film sample #4—100% polypropylene. FIGS. 13-c illustrate that a water-insoluble polymer is typically a dense, homogenous morphology with substantially no porosity. The outer surface is shown in FIG. 13a FIG. 13a shows an outer surface that is dense and displaying substantially no porosity. The cross-sectional view is shown in FIG. 13b at a magnification of 200 times. FIG. 13b shows plate-like domains of polymer that were revealed during brittle facture of the film. Another cross-sectional view is shown in FIG. 13c at a magnification of 1000 times. FIG. 13c shows a dense, fibrillar morphology.

Figure 14A:
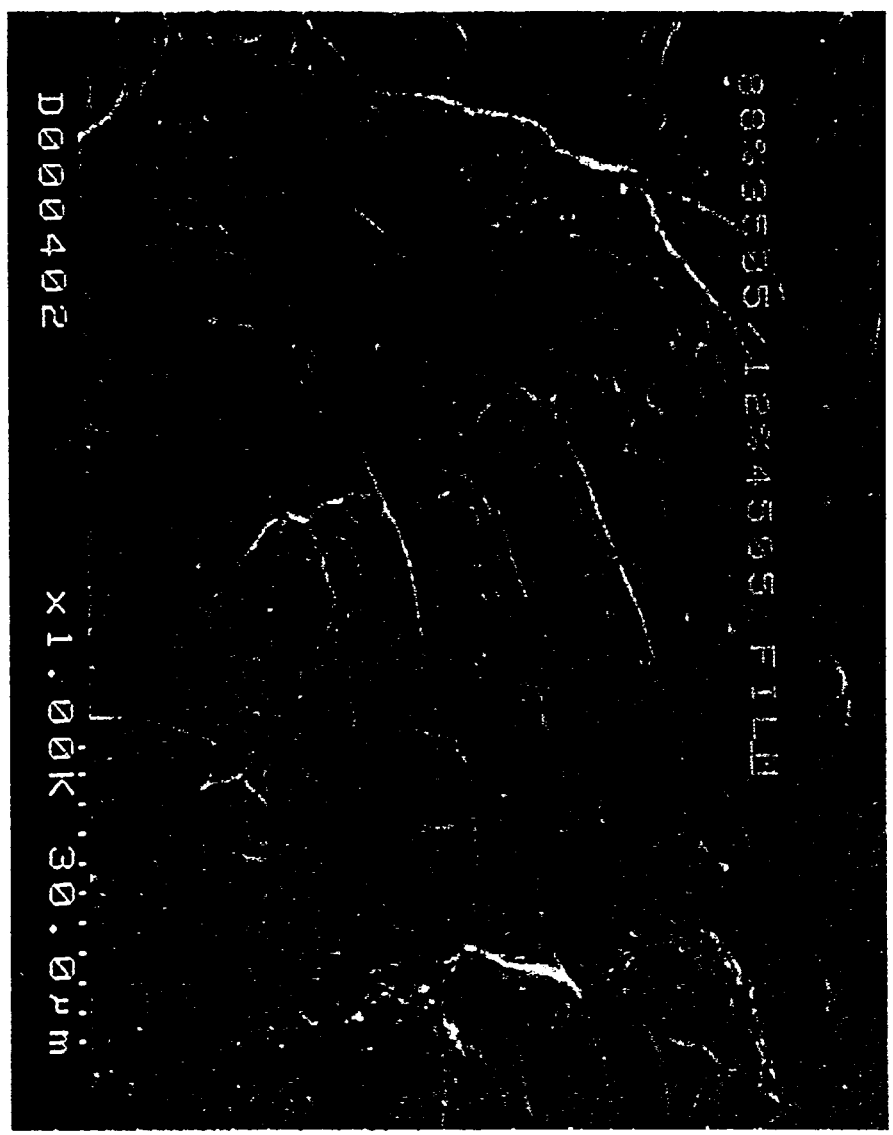
FIG. 14a–c are scanning electron photomicrographs of a film sample of Film #5.
Figure 14B:
Figure 14C:
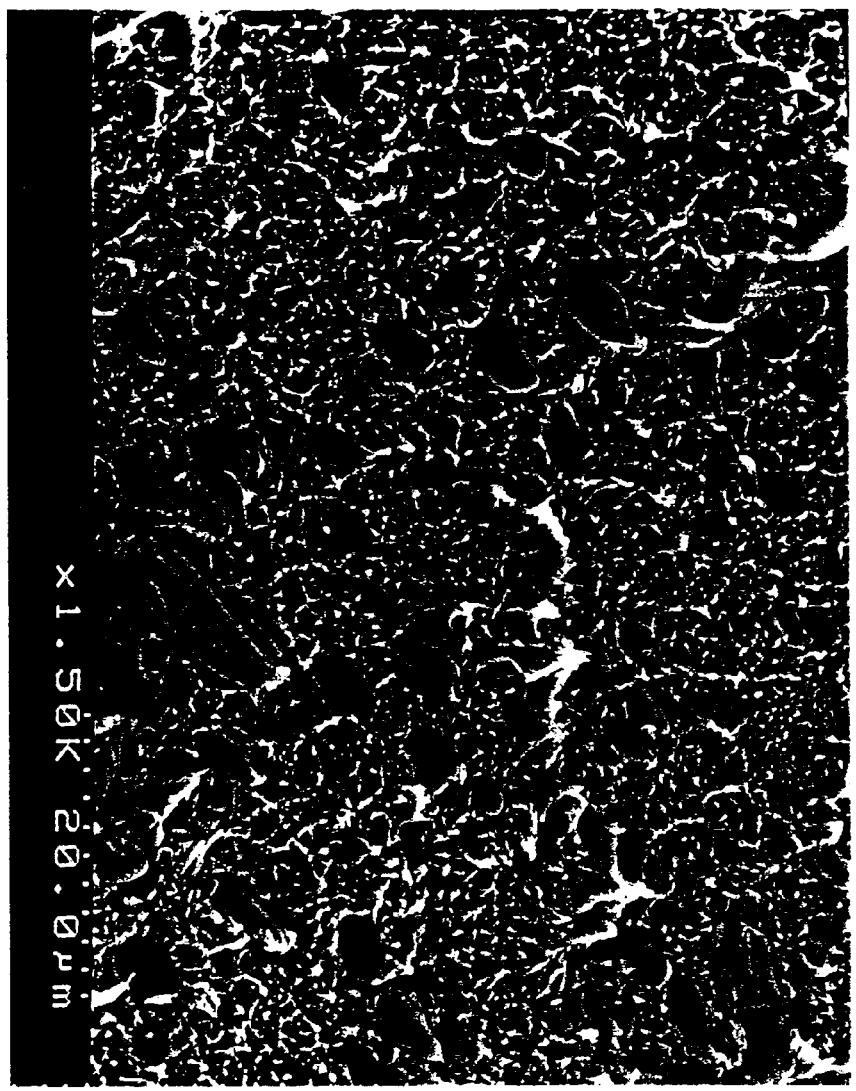

FIGS. 14a–c are scanning electron photomicrographs of film samples #5—about 88% polypropylene and 12% poly(ethylene glycol). FIGS. 14a–c illustrate that a two phase system consisting essentially of a water-insoluble polymer and hydrophilic agent has a heterogeneous morphology with dense fibrillar matrix interspersed with domains of lamellar structures, which is the poly(ethylene glycol). FIGS. 14a–c further show voids between lamellar fibrillar and fibrillar structures that are channels and are oriented in the same direction. The outer surface is shown in FIG. 14a at a magnification of 1000 times. FIG. 14a shows an outer surface that is dense and displaying substantially no porosity. The cross-sectional view is shown in FIG. 14b at a magnification of 2,500 times. FIG. 14b shows fibrillar domains of polymer coated with lamellar strands of poly(ethylene glycol). FIG. 14c is a cross-sectional view of film sample #5 fractured a perpendicular angle and at a magnification of 1,500 times. FIG. 14c shows the fibrillar polypropylene matrix interspersed with solid, amorphous cylinder of poly(ethylene glycol).

Figure 15A:
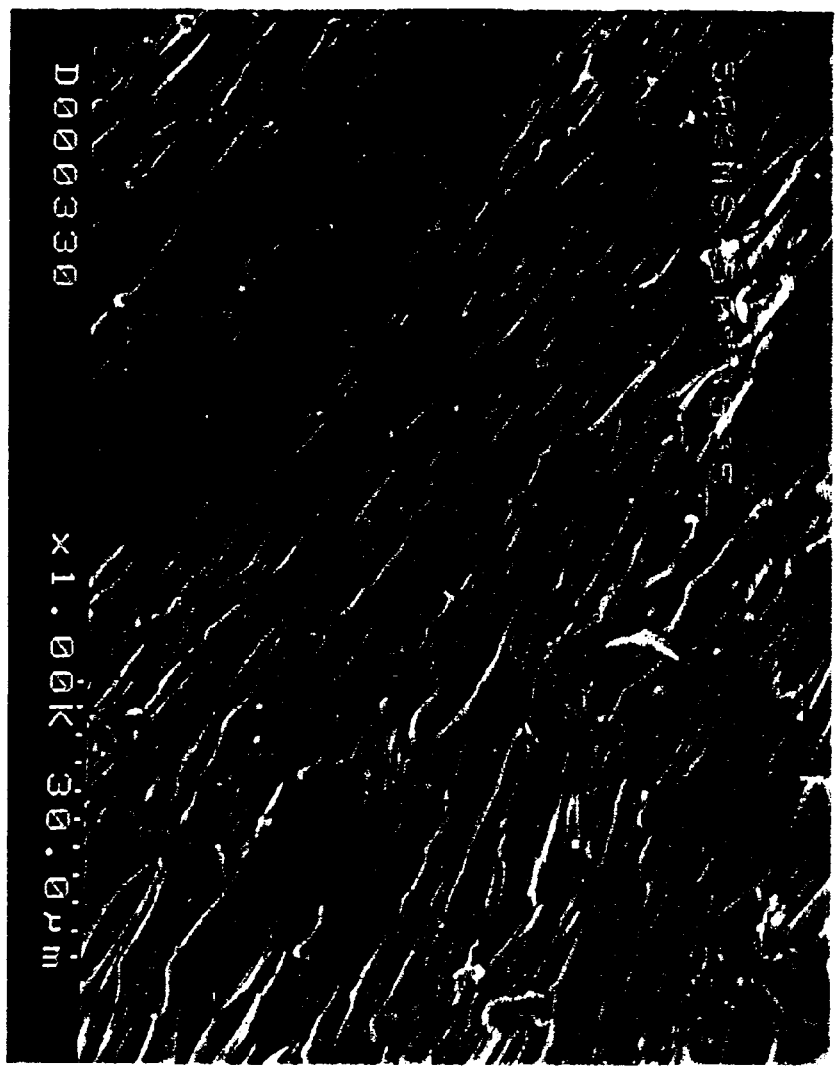
FIG. 15a–c are scanning electron photomicrographs of a film sample of Film #6.
Figure 15B:
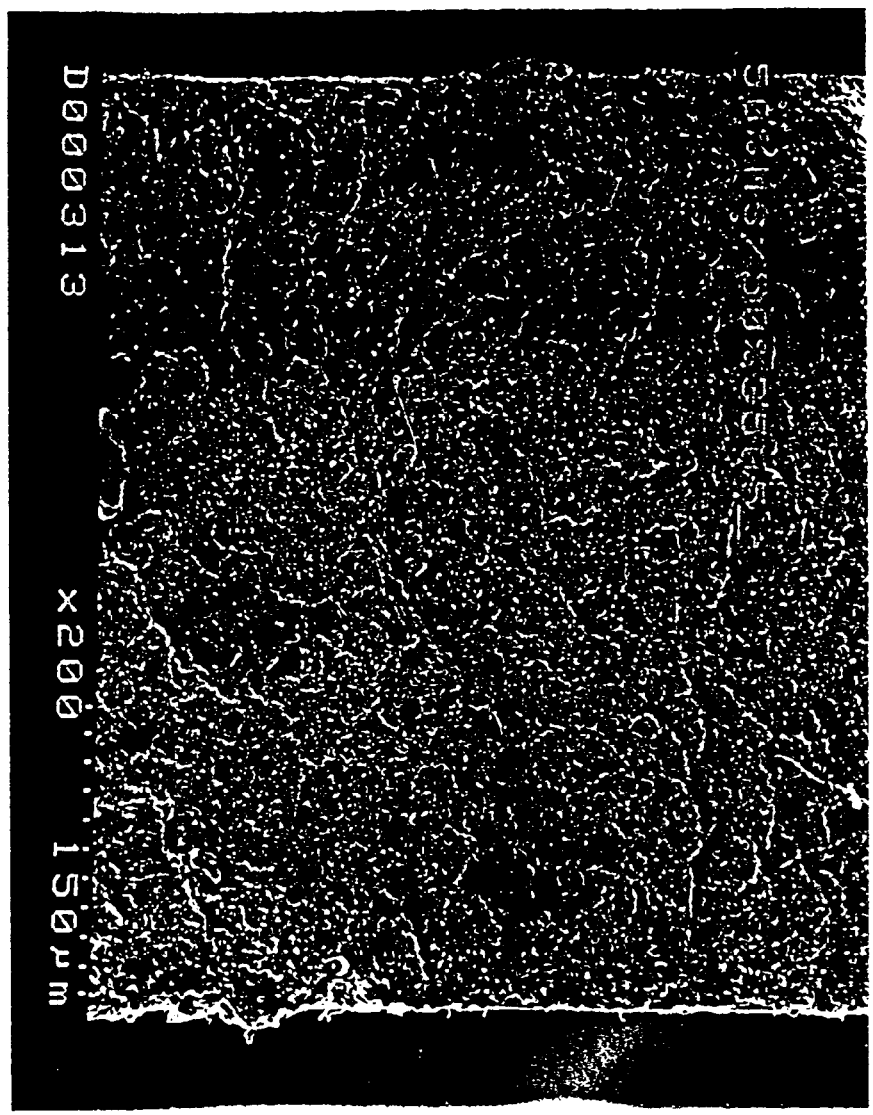
Figure 15C:
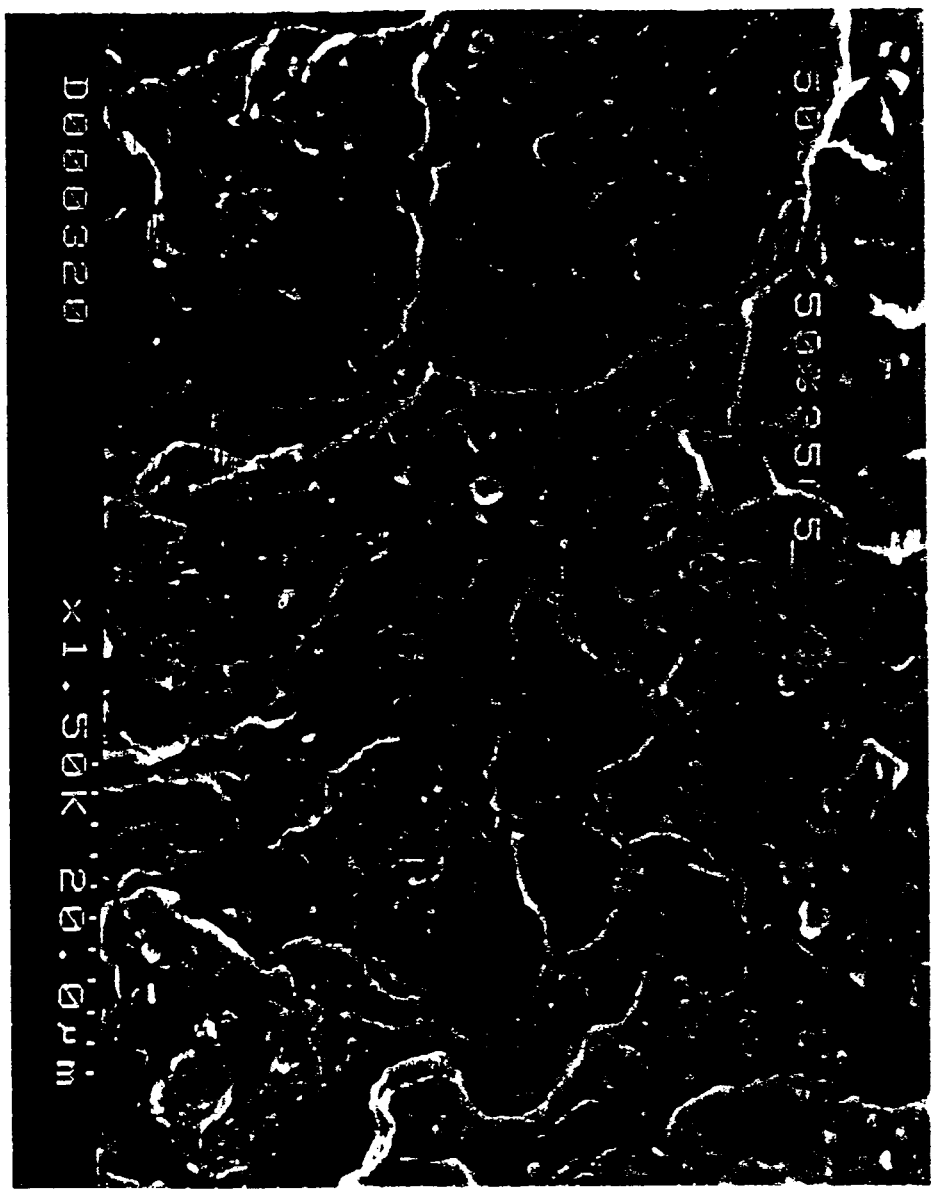

FIGS. 15a–c are scanning electron photomicrographs of film sample #6—about 50% polypropylene and 50% molecular sieve. FIGS. 15a–c illustrate a typically homogeneous dense matrix and discrete molecular sieves can only occasionally be seen and are deeply embedded in the polymer despite the high loading of molecular sieves. FIG. 15a shows the outer surface at a magnification of 1,000 times that is covered with long channels measuring 5–30 microns. The outline of the molecular sieves (1–10 microns) can be seen embedded beneath the surface of the polymer. The cross-sectional view is shown in FIG. 15b at a magnification of 200 times. FIG. 15b shows plate-like domains of polymer and a grainy appearance due to the high loading of molecular sieves. FIG. 15c is a cross-sectional view at a magnification 1,500 times and shows a dense morphology, substantially no porosity and many small particles embedded in the polymer.

Figure 16A:
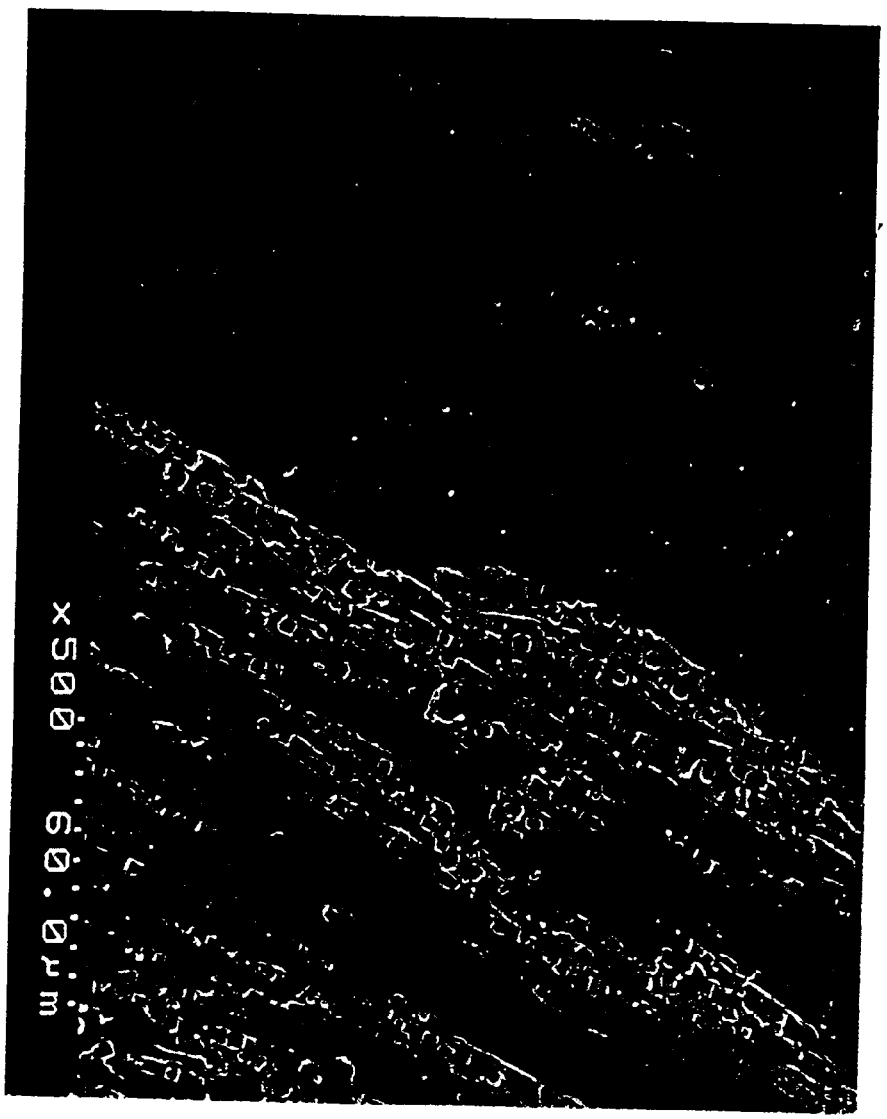
FIG. 16a–d are scanning electron photomicrographs of a film sample of Film #3.
Figure 16B:
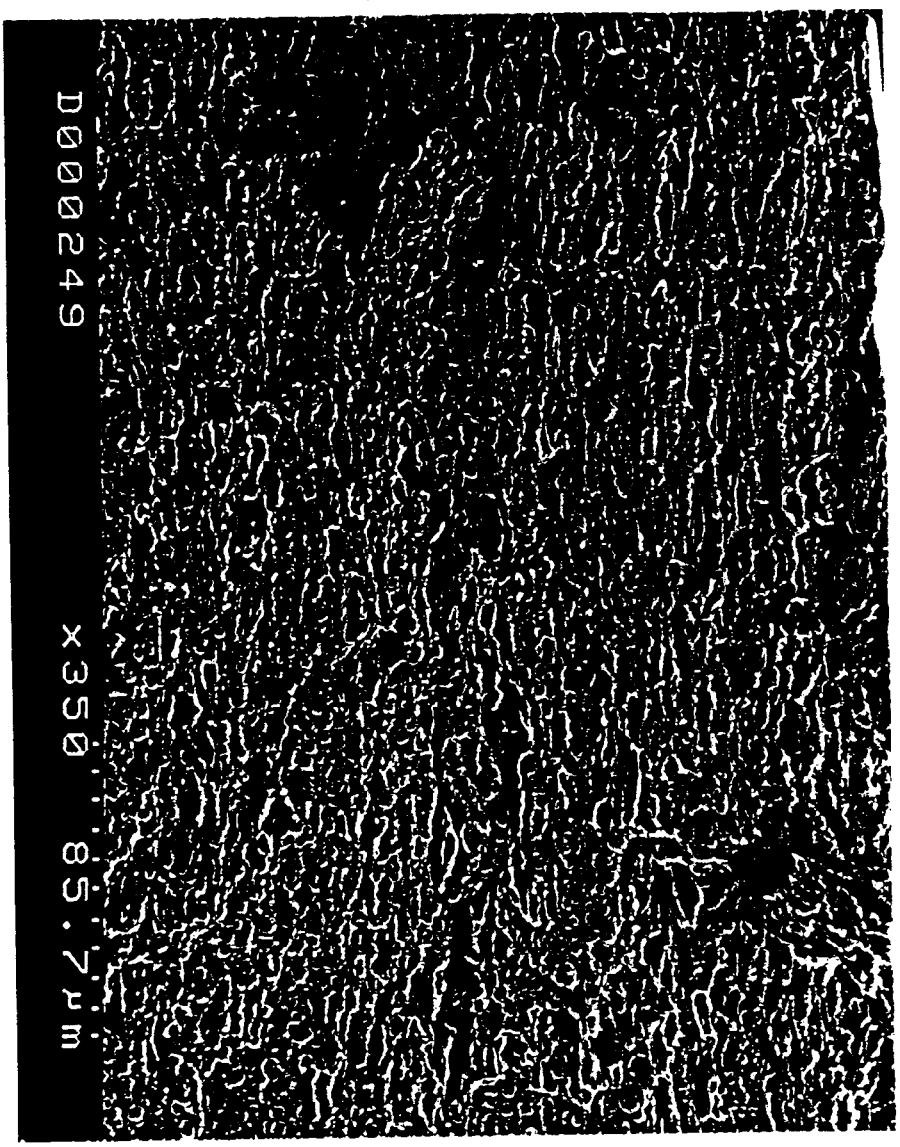
Figure 16C:
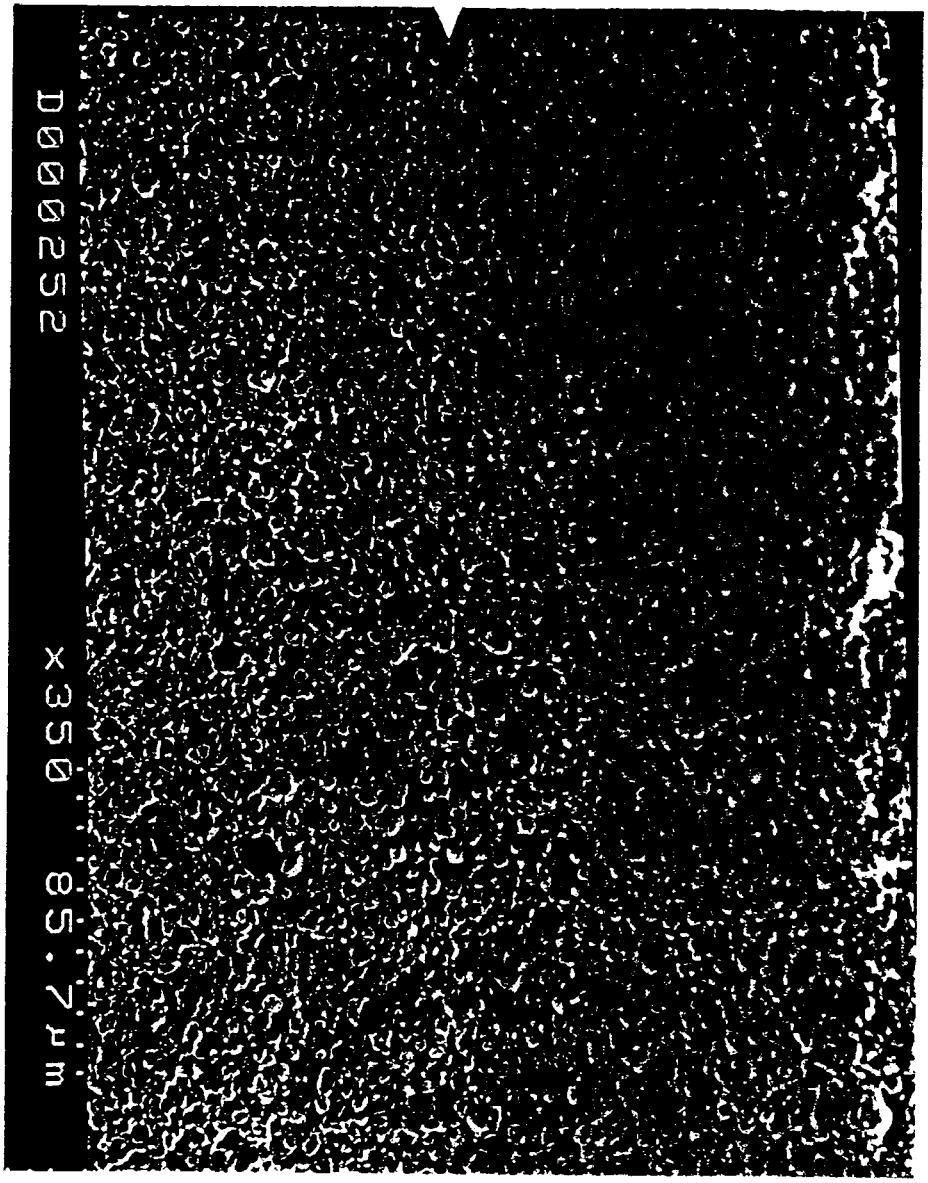
Figure 16D:
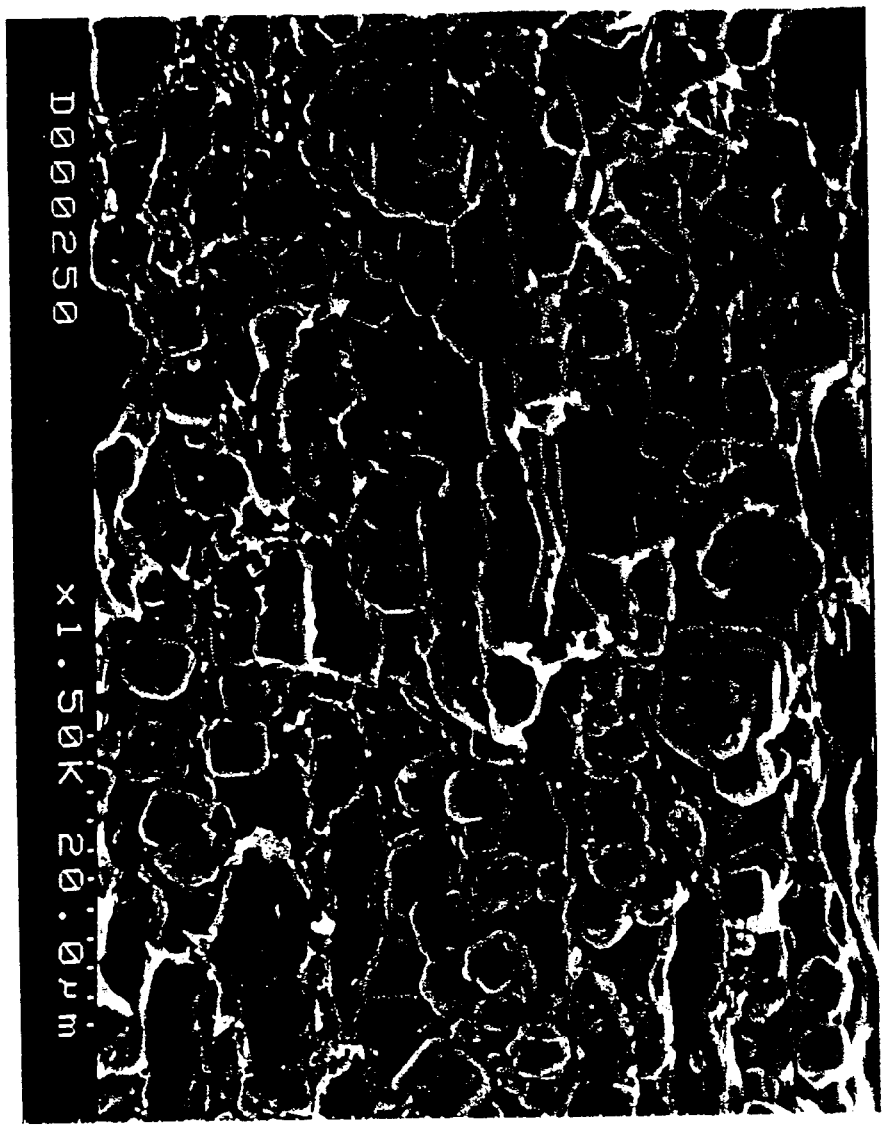

FIGS. 16a–d are scanning electron photomicrographs of film samples #3—about 52% molecular sieve, about 34% polypropylene and about 12% poly(ethylene glycol). FIGS. 16a–d show a three phase system with a highly porous morphology. FIG. 16a shows the outer surface at a magnification of 500 times that is covered with long channels, measuring 5–30 microns, and that is filled with numerous discrete molecular sieve particles. A cross-sectional view is shown in FIG. 16b at a magnification of 350 times. FIG. 16b shows a very porous morphology with long channels running in the fracture orientation. FIG. 16c is a cross-sectional view in the perpendicular orientation at a magnification of 350 times and appears to show holes. FIG. 16d is at higher magnifications—1,500 times. FIG. 16d shows channels containing discrete molecular sieves as well as agglomerates of many sieves embedded in the poly(ethylene glycol). Consequently, based on FIG. 16b, it is believed that the holes seen in FIGS. 16b and 16c are locations where the molecular sieve fell out during fracture preparation for SEM.

In conclusion, Examples 1, 2 and 3 further confirm the theory for the formation of a co-continuous interconnecting channel morphology.

EXAMPLE 4

The purpose of the following example is to demonstrate that the composition of the present invention results in a composition that has modified surface properties of component A when compared to a standard sample of component A.

The compositions were composed of the following (% by weight of total):
Sample #1:
Component A: 35% polypropylene homopolymer. The manufacturer was Aristech Corp. and the tradename was "Ti4040G".
Component B: 5% polyethylene glycol. The manufacturer was Dow Chemical Co. and the tradename was "E4500".
Component C: 60% molecular sieve. The manufacturer was ELF Atochem North America and the tradename is "Siliporite" and the grade is "MS4A".
Sample #2:
Component A: 95% polypropylene homopolymer ("Ti40405").
Component B: 5% polyethylene glycol ("E4500").
Sample #3:
Component A: 100% polypropylene homopolymer ("Ti4040G").

Samples #1, #2 and #3 were produced by the following general method. Component A, B and/or C were weighed out according to the formulation above and then were hand mixed for a sufficient time to form a uniform blend. The blend was fed to a Leistriz® twin screw extruder and then to a three roll calendering stack to form a film of about 0.010 inches thickness.

The resulting film were tested using ASTM D 1876-95 peel test. The adhesive used was from 3M with a tradename "315 EK", double sided adhesive. The three samples were tested prior to the molecular sieve reaching its total moisture capacity. The double sided adhesive was applied to the less glossy side of each sample. A model "TT" Instron was used to run the peel test. The average results, based on ten samples of each, were the following: (1) Sample #1: 0.73 pounds/inch of width; (2) Sample #2: 0.98 pounds/inch of width; and (3) Sample #3: 1.41 pounds/inch of width. Consequently, the results demonstrate that the present invention comprising components A, B and C forming a co-continuous interconnecting channel morphology modified the surface properties of a material compared to a sample of only component A and further modified the surface properties of a composition compared only to a sample of components A and B.

Monolithic compositions having co-continuous interconnecting channel morphology and their constituent compounds have been described herein. As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without departing from the teachings, spirit and intended scope of the invention.

What is claimed is:

1. A method comprising the control of surface properties of a composition by forming a composition having a co-continuous interconnecting channel morphology comprising at least three components,
   (a) wherein component A is selected from the group of polymers that are semicrystalline polymers and amorphous polymers, wherein the amorphous polymers have a shear modulus greater than about 8 MPa;
   (b) wherein component B is a polymer;
   (c) wherein components A and B are immiscible within each other and, if components A and B react after mixing, components A and B are immiscible prior to reaction;
   (d) wherein component C is a particle;
   (e) wherein the volume fraction of component A represents at least about 50% by volume of the total volume of components A, B and C;
   (f) wherein the preferential affinity between component B and component C is greater than between component A and component C;
   (g) wherein at least two phases are formed, one phase is composed of a majority of component A, and the second phase is composed of a majority of component B and a majority of component C;
   (h) wherein the two phases form the co-continuous interconnecting channel morphology; and
   (i) wherein the control of surface properties is to enhance the capability of component A to accept printing ink.

2. The method of claim 1, wherein the method further includes forming the composition into a shaped article selected from the group consisting of films, sheets and labels.

3. The method of claim 1, wherein the amount of component C is between about 5 to about 15% by weight of the total composition.

4. The method of claim 1, wherein the amount of component B is between about 20 to about 60% by weight of the total composition.

5. A method of controlling the surface properties of a composition by a composition having co-continuous interconnecting channel morphology comprising at least five components, (a) wherein component A is selected from the group of polymers that are semicrystalline polymers and amorphous polymers, wherein the amorphous polymers have a shear modulus greater than about 8 MPa;

(b) component B and B' are polymers;

(c) components A, B and B' are immiscible within each other;

(d) components C and C' are particles;

(e) the volume fraction of component A represents at least about 34% by volume of the total volume of components A, B, B', C and C';

(f) the preferential affinity between components B and C is greater than either between components A and C and between components B' and C;

(g) the preferential affinity between components B' and C' is greater than either between components A and C' and between components B and C';

(h) at least three phases are formed, one phase is composed of a majority of component A, the second phase is composed of a majority of component B and a majority of component C, and the third phase is composed of a majority of components B' and a majority of components C';

(i) at least three phases form the co-continuous interconnecting channel morphology; and (j) wherein the control of surface properties is to enhance the capability of component A to accept printing ink.

6. The method of claim 5, wherein the method further includes forming the composition into a shaped article selected from the group consisting of films, sheets and labels.

7. The method of claim 5, wherein the amount of component C is between about 5 to about 15% by weight of the total composition.

8. The method of claim 5, wherein the amount of component B is between about 20 to about 60% by weight of the total composition.

9. A composition having a co-continuous interconnecting channel morphology comprising at least three components:

(a) wherein component A is a thermoplastic;

(b) wherein component B is an adhesive selected from the group consisting of acrylate based adhesives, natural rubber based adhesives, synthetic rubber based adhesives, polystyrene polybutadiene random copolymer (SBR), ethylene vinyl acetates (EVA), synthetic rubber adhesives based on block copolymers, polystyrene polybutadiene polystyrene (SBS), polystyrene polyisoprene polystyrene (SIS), vinyl ether based adhesives, silicon based adhesives, polyurethane based adhesives, and chlorinated adhesives;

(c) wherein components A and B are immiscible within each other and, if components A and B react after mixing, components A and B are immiscible prior to reaction;

(d) wherein component C is a particle;

(e) wherein the volume fraction of component A represents at least about 50% by volume of the total volume of components A, B and C;

(f) wherein the preferential affinity between component B and component C is greater than between component A and component C;

(g) wherein at least two phases are formed, one phase is composed of a majority of component A, and the second phase is composed of a majority of component B and a majority of component C; and (h) wherein the two phases form the co-continuous interconnecting channel morphology and wherein a surface of the composition has an increased adhesive strength compared to component A.

10. The composition of claim 9 wherein, when pressure is applied to the composition, a portion of component B is directed to the surface of the composition.

11. The composition of claim 9, wherein the composition is a shaped article selected from the group consisting of films, sheets and labels.

12. The composition of claim 9, wherein the amount of component C is between about 5 to about 15% by weight of the total composition.

13. The composition of claim 9, wherein the amount of component B is between about 20 to about 60% by weight of the total composition.

* * * * *

UNITED STATES PATENT AND TRADEMARK OFFICE
CERTIFICATE OF CORRECTION

PATENT NO. : 6,696,002 B1
DATED : February 24, 2004
INVENTOR(S) : Ihab Hekal

It is certified that error appears in the above-identified patent and that said Letters Patent is hereby corrected as shown below:

<u>Title page,</u>
Item [73], Assignee, should read -- Capitol Specialty Plastics, Inc. --.

Signed and Sealed this

Eighteenth Day of October, 2005

JON W. DUDAS
*Director of the United States Patent and Trademark Office*